(12) United States Patent
Fukumoto

(10) Patent No.: US 11,416,438 B2
(45) Date of Patent: Aug. 16, 2022

(54) CIRCUIT DEVICE, ELECTRONIC DEVICE, CABLE HARNESS, AND DATA TRANSFER METHOD

(71) Applicant: SEIKO EPSON CORPORATION, Tokyo (JP)

(72) Inventor: Chihiro Fukumoto, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/982,595

(22) Filed: May 17, 2018

(65) Prior Publication Data

US 2018/0336160 A1    Nov. 22, 2018

(51) Int. Cl.
*G06F 3/00* (2006.01)
*G06F 13/42* (2006.01)
*G06F 13/40* (2006.01)

(52) U.S. Cl.
CPC ...... *G06F 13/4295* (2013.01); *G06F 13/4068* (2013.01); *G06F 2213/0042* (2013.01)

(58) Field of Classification Search
CPC ............................. G06F 13/4295; G06F 13/406
USPC ............................................................. 710/5
See application file for complete search history.

(56) References Cited

U.S. PATENT DOCUMENTS

| | | | | |
|---|---|---|---|---|
| 5,084,891 A * | 1/1992 | Ariyavisitakul | ...... | H04W 88/08 714/775 |
| 7,042,932 B1 * | 5/2006 | Song | ..................... | H04J 3/0602 375/211 |
| 7,194,638 B1 * | 3/2007 | Larky | ................... | G06F 1/3209 713/400 |
| 7,500,027 B2 * | 3/2009 | Wu | ..................... | G06F 13/4086 710/15 |
| 2001/0026630 A1 * | 10/2001 | Honda | ..................... | G06T 9/00 382/107 |
| 2002/0062457 A1 | 5/2002 | Kamihara | | |
| 2005/0066087 A1 | 3/2005 | Wu | | |
| 2012/0059965 A1 * | 3/2012 | Foster | ................. | G06F 13/4282 710/305 |
| 2016/0182981 A1 * | 6/2016 | Minarik | .................. | H04Q 9/04 |

FOREIGN PATENT DOCUMENTS

| JP | H06-69932 A | 3/1994 |
|---|---|---|
| JP | 2002-141911 A | 5/2002 |
| JP | 2006-135397 A | 5/2006 |

OTHER PUBLICATIONS

Universal Serial Bus Interface, Apr. 27, 2000, Revision 2.0, p. 8 (Year: 2000).*

(Continued)

*Primary Examiner* — Chun Kuan Lee
(74) *Attorney, Agent, or Firm* — Rankin, Hill & Clark LLP

(57) ABSTRACT

A circuit device includes a first physical layer circuit to which a first bus is connected, a second physical layer circuit to which a second bus is connected, and a processing circuit that performs transfer processing in which a packet received from the first bus via the first physical layer circuit is transmitted to the second bus via the second physical layer circuit. The processing circuit includes a SYNC generation circuit that generates an m-bit SYNC, and when the packet is received from the first bus, the processing circuit outputs the m-bit SYNC to the second physical layer circuit.

20 Claims, 15 Drawing Sheets

(56) References Cited

OTHER PUBLICATIONS

Universal Serial Bus 3.0 Specification, Nov. 2, 2008, Revision 1.0, pp. 1, 6-2 to 6-3, 10-31 and 10-47 (Year: 2008).*
Universal Serial Bus Interface, Apr. 27, 2000, Revision 2.0, pp. 8, 16, 37-38, 71, 140-141, 159, 324-325 (Year: 2000).*

* cited by examiner

CIRCUIT DEVICE, ELECTRONIC DEVICE, CABLE HARNESS, AND DATA TRANSFER METHOD

TRANSFER METHOD

This application claims the benefit of priority from Japanese Patent Application No. 2017-099503 filed May 19, 2017, the entire contents of which are incorporated herein by reference.

BACKGROUND

1. Technical Field

The present invention relates to a circuit device, an electronic device, a cable harness, a data transfer method, and the like.

2. Related Art

A circuit device that realizes USB (Universal-Serial-Bus) data transfer control is known.

For example, JP-A-2006-135397 discloses technology in which an enable control signal for a current source of an HS (High Speed) mode transmission circuit is set to active at a timing before a packet transmission start timing. US-7047434 discloses technology in which, in the case where a switch from the HS mode to an FS (Full Speed) mode is performed, self-running is disabled for a PLL that generates a high-speed clock for the HS mode.

In USB technology, there is a desire to connect some sort of device between a host controller and a peripheral device in some cases. For example, when multiple peripheral devices are to be connected to the host controller, a USB hub (hub device) is provided. Alternatively, in the case where it is difficult to pass the EYE pattern authentication test in the HS mode due to the parasitic capacitance of the signal path or the like, a device that suppresses a degradation of signal characteristics of a USB signal may be provided.

However, in order to pass the USB standard authentication test, the packet at the end of the signal path (e.g. USB receptacle) where the authentication test is performed needs to have a SYNC with the number of bits defined in the USB standard. If a USB hub or the like is provided as above, the number of bits of SYNC of the packet output from the USB hub or the like is less than the number of bits of SYNC of the packet that is input to the USB hub or the like. This is due to operations performed when detecting packets in the physical layer circuit, and in the USB standard for example, one USB hub is allowed to reduce the number of bits of SYNC by up to 4 bits. For this reason, if the USB hub or the like is provided in the signal path of the transmission signal, the USB standard authentication test cannot be passed at the end of the signal path.

Note that it is not only in the case of USB, but there is a risk that similar problems as above will occur also in serial communication in which packets include SYNC (synchronization signal).

SUMMARY

According to several aspects of the present disclosure, it is possible to provide a circuit device, an electronic device, a cable harness, a data transfer method, and the like according to which an authentication test of a serial communication standard can be passed at the end of a signal path of a transmission signal in serial communication when provided in the signal path.

A first aspect relates to a circuit device including: a first physical layer circuit to which a first bus compliant with a given serial communication standard is connected; a second physical layer circuit to which a second bus compliant with the given serial communication standard is connected; and a processing circuit that performs transfer processing in which a packet that includes a SYNC and data and was received from the first bus via the first physical layer circuit is transmitted to the second bus via the second physical layer circuit. The processing circuit includes a SYNC generation circuit that generates an m-bit SYNC (m being an integer greater than or equal to 1), and upon receiving the packet from the first bus, the processing circuit outputs the m-bit SYNC generated by the SYNC generation circuit to the second physical layer circuit as a SYNC of the packet transmitted to the second bus.

According to the first aspect, when a packet is received by the processing circuit from the first bus via the first physical layer circuit and the packet is to be output to the second bus via the second physical layer circuit, an m-bit SYNC generated by the SYNC generation circuit is output to the second physical layer circuit as the SYNC of the packet that is transmitted to the second bus. Accordingly, a packet having an m-bit SYNC is output to the second physical layer circuit from the processing circuit, regardless of the number of bits of the SYNC of the packet that is input to the processing circuit from the first physical layer circuit. With this configuration, an authentication test of the serial communication standard can be passed at the end of the signal path when the circuit device is provided in the signal path of the transmission signal of the serial communication.

Also, in the first aspect, the second physical layer circuit may output the m-bit SYNC to the second bus even if the number of bits of the SYNC of the packet received by the first physical layer circuit from the first bus is less than or equal to m bits.

With this configuration, even if a SYNC having a number of bits less than or equal to m bits is input to the first physical layer, the second physical layer circuit can output the m-bit SYNC to the second bus.

Also, in the first aspect, the processing circuit may also include: an elasticity buffer that buffers the packet; a repeater circuit that has the SYNC generation circuit and performs transfer processing of the packet that is buffered in the elasticity buffer; and a parallel-to-serial conversion circuit that performs parallel-to-serial conversion on data output from the repeater circuit and outputs the converted data to the second physical layer circuit.

With this configuration, the packet input from the first bus via the first physical layer circuit is buffered in the elasticity buffer, and the buffered packet is subjected to transfer processing by the repeater circuit and output to the parallel-to-serial conversion circuit, and the packet output from the parallel-to-serial conversion circuit is output to the second bus via the second physical layer circuit. In this way, the circuit device can transfer the packet from the first bus to the second bus. Also, in the first aspect, the SYNC generation circuit generates an m-bit SYNC, and thus the number of bits of the SYNC of the packet to be output to the second bus can be set to m bits.

Also, in the first aspect, it is also possible that, when the reception of the packet is started and data of a given number of bits is accumulated in the elasticity buffer, the SYNC generation circuit starts the output of the m-bit SYNC, and the m-bit SYNC is output from the parallel-to-serial conversion circuit.

With this configuration, when data of a given number of bits is accumulated in the elasticity buffer, the output of m-bit SYNC from the processing circuit is started, and thus the packet having the m-bit SYNC can be output to the second bus, and also an overrun and an underrun of the bits in asynchronous communication can be prevented.

Also, in the first aspect, the repeater circuit may also have a repeat buffer, and when an end of the SYNC of the packet buffered in the elasticity buffer is detected during the output of the m-bit SYNC performed by the SYNC generation circuit, the repeat buffer may accumulate data that follows the SYNC of the packet among data from the elasticity buffer.

With this configuration, it is possible to transfer (repeat) the data after SYNC that is the substantial content of the data of the packet, without a change, and also to add the m-bit SYNC to the data.

Also, in the first aspect, the processing circuit may transmit a packet received from the second bus to the first bus via the first physical layer circuit, the processing circuit may include a second SYNC generation circuit that generates a k-bit SYNC (k being an integer greater than or equal to 1), and upon receiving the packet from the second bus, the processing circuit may output the k-bit SYNC generated by the second SYNC generation circuit to the first physical layer circuit.

With this configuration, the number of bits of the SYNC in the transmission packet can be set to a given number of bits (m or k) in bidirectional transfer, that is, from the first bus to the second bus, and from the second bus to the first bus.

Also, in the first aspect, the first physical layer circuit may output the k-bit SYNC to the first bus even if the number of bits of the packet received by the second physical layer circuit from the second bus is less than or equal to k bits.

With this configuration, even if a SYNC having a number of bits less than or equal to k bits is input to the second physical layer circuit, the first physical layer circuit can output a k-bit SYNC to the first bus.

Also, in the first aspect, the circuit device may further include a register circuit that sets the number of bits m of the m-bit SYNC to any number.

With this configuration, in the case where the circuit device transfers a packet, the packet having the SYNC of an arbitrary number (m) of bits can be output. Accordingly, it is possible to arrange the circuit device in various positions in the transfer path compliant with the predetermined serial communication standard for the electronic device.

Also, in the first aspect, the serial communication standard may be a USB standard.

With this configuration, when the circuit device is provided in the signal path of a USB transmission signal, the USB standard authentication test can be passed at the end of the signal path.

Also, another aspect relates to an electronic device that includes the circuit device according to any of the above aspects and a processing device that is connected to the first bus.

Also, yet another aspect relates to a cable harness that includes the circuit device according to any of the above aspects, and a cable.

Also, yet another aspect relates to a data transfer method in which a packet received from a first bus in compliance with the given serial communication standard is repeated and transferred to a second bus compliant with the given serial communication standard, and even if the number of bits of the SYNC of the packet received from the first bus is less than or equal to m bits, an m-bit SYNC is output to the second bus.

BRIEF DESCRIPTION OF THE DRAWINGS

Embodiments will be described with reference to the accompanying drawings, wherein like numbers reference like elements.

DESCRIPTION OF EXEMPLARY EMBODIMENTS

The following is a detailed description of exemplary embodiments of the invention. Note that the embodiments described below are not intended to unduly limit the content of the invention recited in the claims, and all of the configurations described in the embodiments are not necessarily essential as solutions provided by the invention.

For example, the description will be given below taking USB as an example of the serial communication standard, but the disclosure can also be applied to a serial communication standard in which SYNC is provided at the head of a packet in asynchronous communication.

1. Number of Bits of SYNC

Figure 1:
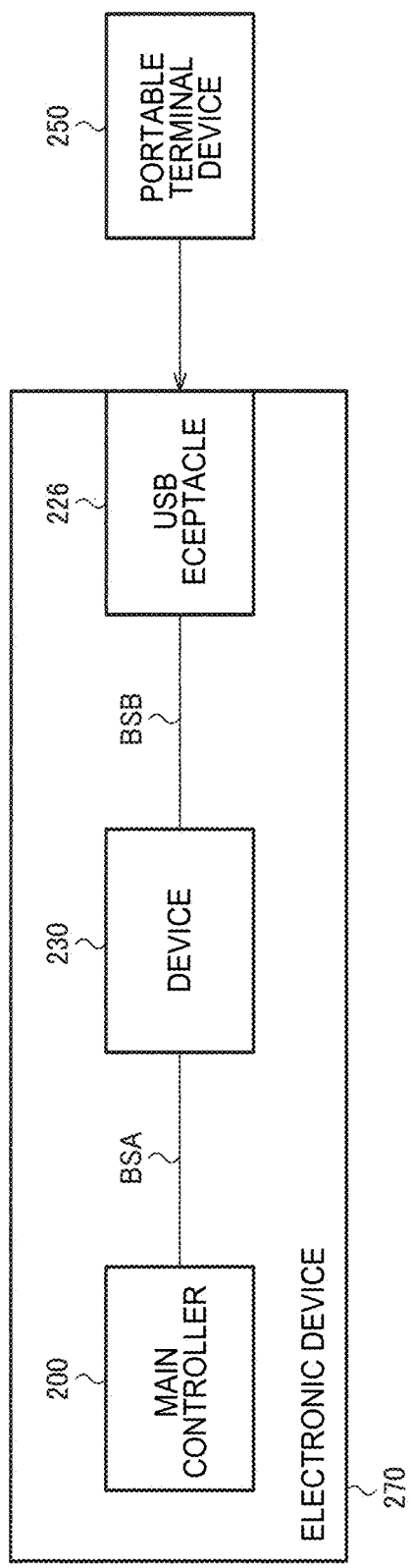
FIG. 1 shows an example of an electronic device system.

FIG. 1 shows an example of an electronic device system. In FIG. 1, a portable terminal device 250 is connected to an electronic device 270 via a USB receptacle 226 (connector compliant with the USB standard), and USB standard communication is performed between a main controller 200 (host controller) of the electronic device 270 and the portable terminal device 250.

A device 230 is provided between the main controller 200 and the USB receptacle 226, the main controller 200 and the device 230 are connected to each other via a bus BSA compliant with the USB standard, and the device 230 and the USB receptacle 226 are connected to each other via a bus BSB compliant with the USB standard. It is sufficient that the device 230 can transfer packets between the bus BSA and the bus BSB, and example of the device 230 includes a USB hub whose upstream port is connected to the main controller 200. Alternatively, the device 230 may be a device that suppresses a degradation of signal characteristics of USB signals as will be described later with reference to FIGS. 12 to 14.

Figure 2:
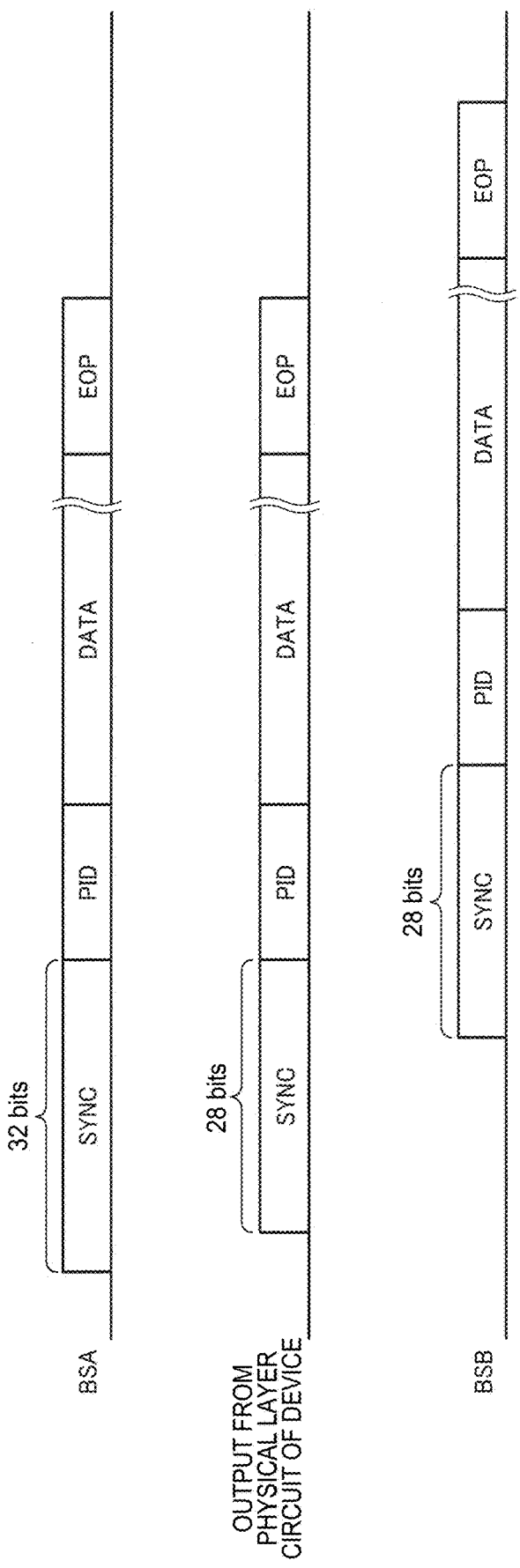
FIG. 2 shows an example of packets in HS mode communication in the electronic device system.

FIG. 2 shows an example of packets in communication in an HS mode of the above-described system. A packet that is to be output by the main controller 200 to the device 230 via the bus BSA includes, for example, a 32-bit SYNC (synchronization signal, synchronization data), a PID (packet ID), a DATA (data), and an EOP (end of packet).

A physical layer circuit on the bus BSA side of the device 230 detects a packet on the bus BSA, and outputs, to an elasticity buffer, a packet having a SYNC with 4 fewer bits (28 bits), for example. A SYNC in USB is constituted by repeating "K" and "J", and the packet is detected by a squelch detection circuit of the physical layer circuit detecting this signal. At this time, there is a delay period from when the input of SYNC is started until when the squelch detection circuit detects the SYNC, and thus the number of bits of the SYNC is reduced. Thereafter, this packet is transferred to the bus BSB via a processing circuit (e.g. repeater circuit) and the physical layer circuit on the bus BSB side, and received by the portable terminal device 250 via the USB receptacle 226.

In this way, the number of bits of the SYNC is reduced due to operations performed when receiving the packet in the physical layer circuit, and if the packet is output to the USB receptacle 226 side as it is, a packet with a SYNC having a number of bits that is less than 32 is output from the USB receptacle 226.

Now, the USB standard authentication is to be obtained for the above-described electronic device 270. At this time, it is necessary for the packet output from the USB receptacle 226 to be compliant with the USB standard, and one of the conditions is that a 32-bit SYNC has been added to the packet. For this reason, in the case of FIG. 2, the electronic device 270 cannot pass the USB standard authentication test.

2. Circuit Device

Figure 3:
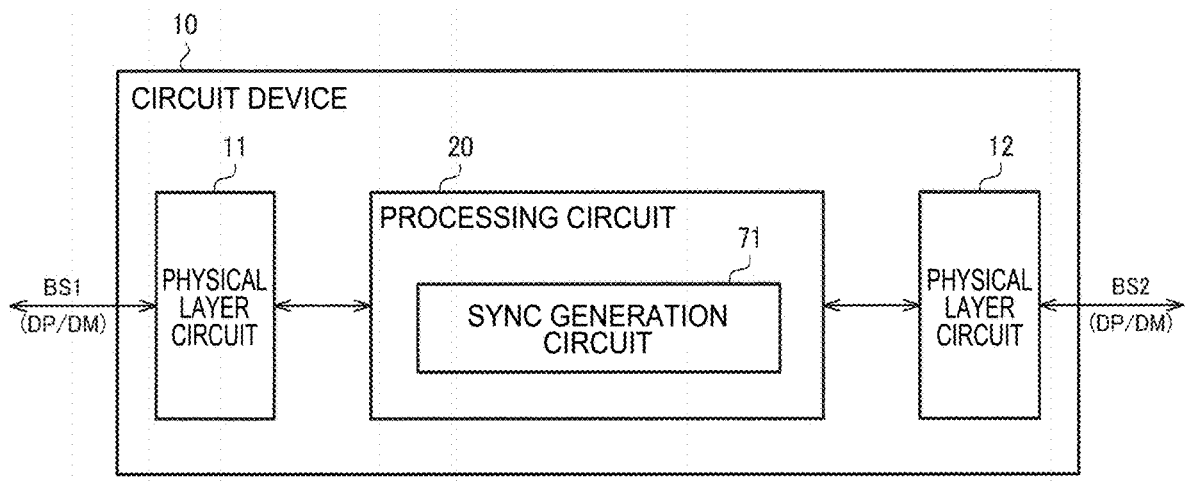
FIG. 3 shows a configuration example of a circuit device according to this embodiment.

FIG. 3 shows a configuration example of a circuit device of this embodiment. The circuit device 10 includes a first physical layer circuit 11, a second physical layer circuit 12, and a processing circuit 20. Note that this embodiment is not limited to the configuration in FIG. 3, and various modifications can be carried out, such as omitting a portion of the constituent elements, or adding other constituent elements.

A first bus BS1 compliant with a given serial communication standard is connected to the first physical layer circuit 11. A second bus BS2 compliant with a given serial communication standard is connected to the second physical layer circuit 12. The processing circuit 20 performs transfer processing in which a packet received from the first bus BS1 via the first physical layer circuit 11 is transmitted to the second bus BS2 via the second physical layer circuit 12. The processing circuit 20 includes a SYNC generation circuit 71 that generates an m-bit SYNC, and when a packet is received from the first bus BS1, the processing circuit 20 outputs the m-bit SYNC (m is an integer greater than or equal to 1) generated by the SYNC generation circuit 71 to the second physical layer circuit 12 as a SYNC to be transmitted to the second bus BS2.

Note that a description will be given taking the USB standard as an example of the given serial communication standard, but the application target is not limited to USB. In other words, the given serial communication standard is a serial communication standard in which the frequency of the transmission signals is out of synchronization with the operation clock frequency of the reception device, the clock signal is not transmitted separately in addition to packet (data), and a SYNC for receiving a packet in synchronization with the frequency of the transmission signals is added to the head of the packet.

The physical layer circuits 11 and 12 are each constituted by an analog circuit of the physical layer. Examples of the physical layer analog circuits include HS and FS transmission circuits, a reception circuit, various detection circuits, and a pull-up resistance circuit. Note that the processing circuit 20 includes circuits that correspond to the link layer, such as a serial-to-parallel conversion circuit that converts serial data received via USB into parallel data, a parallel-to-serial conversion circuit that converts parallel data into serial data, and an NRZI circuit. For example, circuits that correspond to the link layer or the like of a USB transceiver macrocell are included in the processing circuit 20, and analog circuits such as a transmission circuit, a reception circuit, and detection circuits are included in the physical layer circuits 11 and 12.

The bus BS1 is a bus to which the main controller is connected for example, and the bus BS2 is a bus to which the peripheral device is connected for example. It should be noted that this embodiment is not limited to this connection configuration. The buses BS1 and BS2 are buses compliant with the USB standard (a given serial communication standard) and include signal lines for signals DP and DM (first and second signals) that constitute differential signals. The buses BS1 and BS2 can include the signal lines of power source VBUS and GND.

The processing circuit 20 is a circuit that performs transfer processing and various types of control processing, and can be realized by, for example, a logic circuit obtained by automatic placement and routing, such as a gate array. Note that the processing circuit 20 may be realized by a processor such as a CPU or an MPU.

The SYNC generation circuit 71 is a circuit that generates an m-bit SYNC (SYNC in the HS mode) having a pattern of "KJKJ . . . KJKK". "K" and "J" denote signals to be transmitted to the bus (DP/DM), and in the case of "K", DP is low-level and DM is high-level, and in the case of "J", DP is high-level and DM is low-level. Expressed in bits, "K" corresponds to a bit "0", and "J" corresponds to a bit "1". For example, the SYNC generation circuit 71 is a logic circuit constituted so as to generate a pattern (m-bit SYNC) of "KJKJ . . . KJKK", and the pattern generated by this logic circuit is output to the physical layer circuit 12. Alternatively, a pattern of "KJKJ . . . KJKK" is stored in a register or a memory, which is not shown, and the SYNC generation circuit 71 reads and outputs the pattern to the physical layer circuit 12. Note that the SYNC generation circuit 71 may generate anew all the bits of an m-bit SYNC, or may generate an m-bit SYNC by adding bits to a SYNC that is input to the processing circuit 20 from the physical layer circuit 11 and has fewer than m bits.

Figure 4:
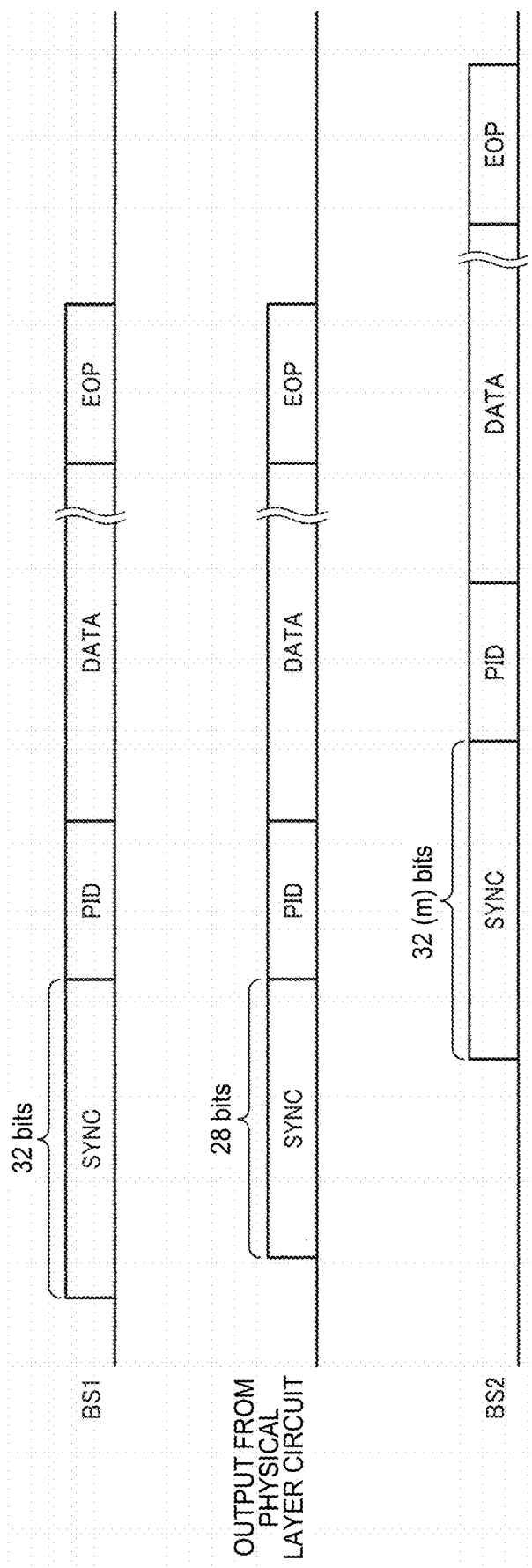
FIG. 4 is an illustrative diagram of operations of the circuit device.

FIG. 4 is a diagram illustrating the operation of the circuit device according to this embodiment. Note that the description will be given taking the example of the case where m is 32, which is the number of bits defined in the USB standard, but the number of bits is not limited thereto, and m may be an integer other than 32. For example, in the case where the number of bits of SYNC decreases in a latter stage of the circuit device 10 before the USB receptacle, m may be an integer that is greater than 32.

As shown in FIG. 4, it is supposed that a packet including a 32-bit SYNC is input to the physical layer circuit 11 from the bus BS1. The packet is, for example, constituted of SYNC, PID, DATA, and EOP. Upon detecting SYNC, the physical layer circuit 11 outputs the packet to the processing circuit 20. At this time, the number of bits of the SYNC is 28, for example. Note that, the number of bits of SYNC that decreases in the physical layer circuit 11 is not limited to 4, and may be less than 4. When the packet is input to the processing circuit 20, the SYNC generation circuit 71 outputs the 32-bit (m-bit) SYNC to the physical layer circuit 12, and subsequently, the processing circuit 20 outputs, to the physical layer circuit 12, PID, DATA, and EOP that are input from the physical layer circuit 11. In this way, the packet having the 32-bit (m-bit) SYNC is output to the bus BS2.

According to the above embodiment, regardless of the number of bits of SYNC of a packet that is input to the processing circuit 20 from the first physical layer circuit 11, a packet including an m-bit SYNC is output to the second bus BS2 from the second physical layer circuit 12. In this way, a SYNC with the number of bits compliant with the USB standard can be output to the USB receptacle of an electronic device, and the USB standard authentication test can be passed in the USB receptacle.

For example, the technique of this embodiment can be applied to the device 230 in the electronic device 270 in FIG. 1. In this case, the number of bits of SYNC decreases in the physical layer circuits of the device 230, but a 32-bit SYNC can be output to the USB receptacle 226. Alternatively, in the case where the device 230 is an USB hub, it is possible to provide the circuit device 10 of this embodiment between the USB hub and the USB receptacle 226. In this case, the number of bits of SYNC decreases in the USB hub and the physical layer circuit 11 of the circuit device 10, but it is possible to output a 32-bit SYNC from the circuit device 10 to the USB receptacle 226. Alternatively, in the case where the device 230 is a USB hub, it is possible to provide the circuit device 10 of this embodiment between the main controller 200 and the USB hub. For example, in the case where the USB hub decreases the number of bits of SYNC by 4 bits, the circuit device 10 outputs a SYNC with 32+4=36 bits to the USB hub (that is, in this example, m=36). Accordingly, the number of bits of the SYNC output from the USB hub is 36−4=32 bits, and thus it is possible to output the 32-bit SYNC to the USB receptacle 226.

Also, in this embodiment, even if the number of bits of SYNC of the packet received by the first physical layer circuit 11 from the first bus BS1 is less than m bits, the second physical layer circuit 12 outputs an m-bit SYNC to the second bus BS2.

In FIG. 4, the number of bits of SYNC of the packet received by the physical layer circuit 11 is m=32, and the number of bits of SYNC of the packet output from the physical layer circuit 12 is also m=32. In this embodiment, if the number of bits of SYNC of the packet received by the physical layer circuit 11 is less than m bits, the SYNC generation circuit 71 generates an m-bit SYNC, and thus the number of bits of SYNC of the packet output from the physical layer circuit 12 is m=32. In other words, even if SYNC with any number of bits less than or equal to m bits is input to the physical layer circuit 11, an m-bit SYNC can be output to the second bus BS2. Note that, even if SYNC with a number of bits that is greater than m bits is input to the physical layer circuit 11, the physical layer circuit 12 can output an m-bit SYNC to the second bus BS2.

Note that the above-described operation of the circuit device 10 can also be implemented as a data transfer method. This data transfer method is a data transfer method in which a packet received from the first bus BS1 compliant with a given serial communication standard is repeated and transferred to the second bus BS2 compliant with a given serial communication standard, and even if the number of bits of SYNC of the packet received from the first bus BS1 is less than or equal to m bits, an m-bit SYNC is output to the second bus BS2. This data transfer method is executed by, for example, the circuit device 10. In other words, the data transfer method is executed as an operating method of the circuit device 10.

3. Detailed Configuration Example

Figure 5:
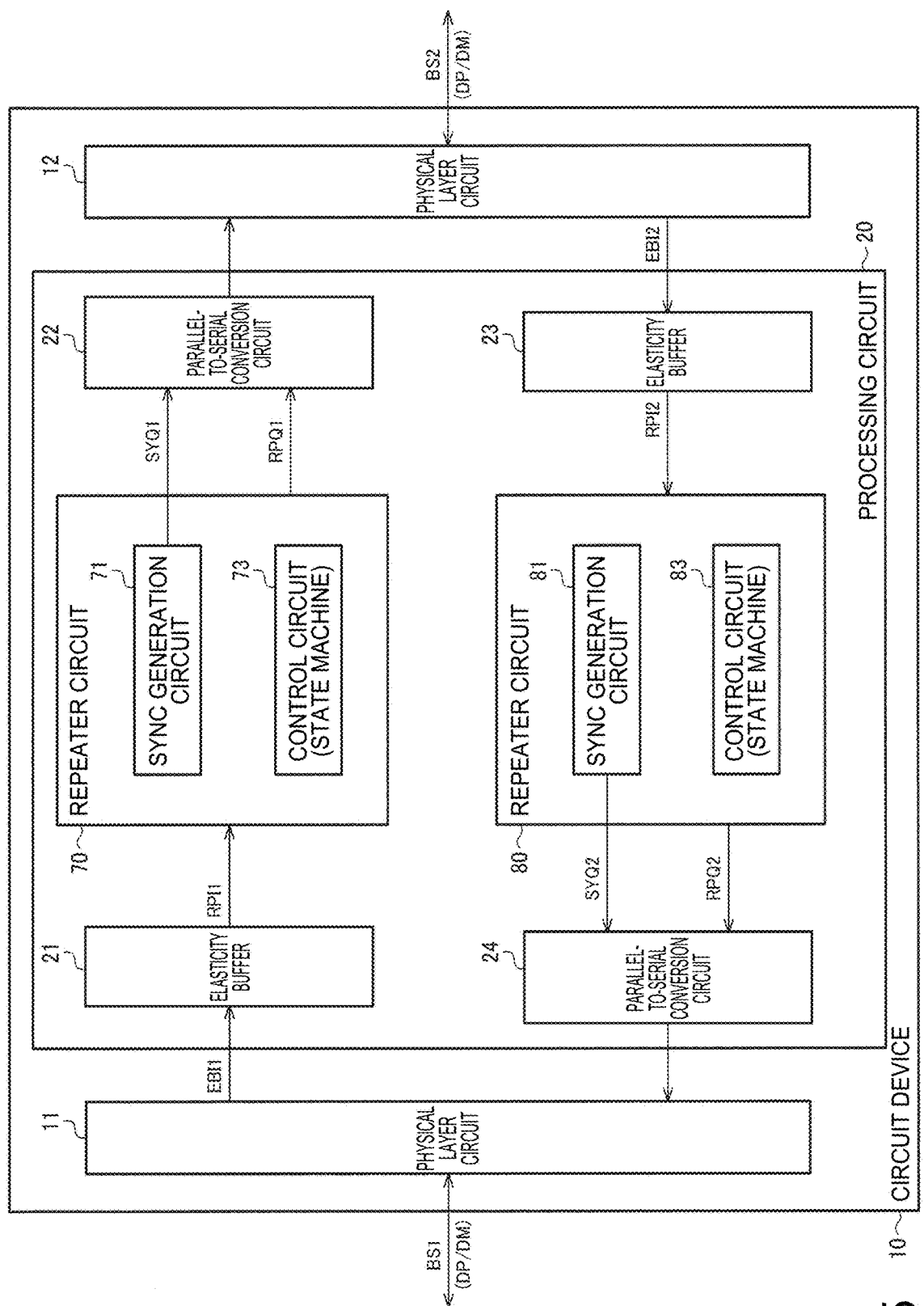
FIG. 5 shows a first detailed configuration example of the circuit device according to this embodiment.

FIG. 5 shows a first detailed configuration example of a circuit device of this embodiment. In FIG. 5, the processing circuit 20 includes elasticity buffers 21 and 23, parallel-to-serial conversion circuits 22 and 24, and repeater circuits 70 and 80 (HS repeater circuits). The repeater circuit 70 includes the SYNC generation circuit 71 and a control circuit 73 (state machine), and the repeater circuit 80 includes a SYNC generation circuit 81 and a control circuit 83 (state machine).

The elasticity buffer 21 buffers packets from the physical layer circuit 11. The repeater circuit 70 performs transfer processing on the packets that are buffered in the elasticity buffer 21. The parallel-to-serial conversion circuit 22 performs parallel-to-serial conversion on data (transfer-processed packets) output from the repeater circuit, and outputs the data to the second physical layer circuit 12.

The elasticity buffer 21 is a buffer that can temporarily accumulate data having a predetermined number of bits. For example, the elasticity buffer 21 includes a DLL circuit that generates a clock signal that is in synchronization with a packet signal input from the physical layer circuit 11, and a serial-to-parallel conversion circuit that takes in (samples) the packet signal using the clock signal and performs serial-to-parallel conversion on the packet signal. In the processing circuit 20, a packet is resynchronized by the clock signal generated inside the circuit device 10, and thus the packet input from the physical layer circuit 11 and the resynchronized packet are out of synchronization with each other. The elasticity buffer 21 is provided for buffering the frequency difference of the packet signals due to the asynchronization. The predetermined number of bits to be accumulated in the elasticity buffer 21 is defined according to the standard or the like, and in the case of the USB standard, the predetermined number is greater than or equal to 12 bits.

The repeater circuit 70 performs transfer processing on packets, such as packet bit resynchronization processing, output of m-bit SYNC from the SYNC generation circuit, transfer of the packets (data after SYNC) accumulated in the elasticity buffer 21, and the like.

Resynchronization processing (resynchronization) is realized by, for example, sampling and taking in the bits of the received packet using the clock signal of the circuit device 10, reconstructing the packet constituted by the taken-in bits, and outputting the reconstructed packet in synchronization with the clock signal of the circuit device 10. Note that at least a portion of resynchronization processing (e.g. bit sampling) may be performed by the elasticity buffer 21. Specifically, the circuit device 10 includes a PLL circuit (PLL circuit 54 in FIG. 12) that generates multiphase clock signals based on the clock signal generated inside the circuit device 10. The multiphase clock signals are clock signals that have the same frequency but different phases. The elasticity buffer 21 includes a not-shown DLL circuit that has an edge detection circuit and a clock selection circuit. The edge detection circuit detects the edge of serial data received by the reception circuit of the physical layer circuit 11, and outputs corresponding edge detection information to the clock selection circuit. Specifically, the edge detection circuit detects whether or not a serial data edge exists between any edges of the multiphase clock signals, and outputs corresponding edge detection information to the clock selection circuit. Based on this edge detection information, the clock selection circuit selects one clock signal out of the multiphase clock signals, and outputs the selected clock signal as a sampling clock signal. By sampling the serial data based on this sampling clock signal, it is possible to realize sampling of the bits of the received packet.

The control circuit 73 is a circuit that controls operation (state transition) of the repeater circuit 70. For example, in packet transfer processing, the control circuit 73 controls a timing for outputting SYNC from the SYNC generation circuit 71, a timing for performing transfer of the packet (data after SYNC) accumulated in the elasticity buffer 21, and the like.

According to this embodiment, a packet input from the bus BS1 via the physical layer circuit 11 is buffered in the elasticity buffer 21, and the buffered packet is transfer-processed in the repeater circuit 70 and output to the parallel-to-serial conversion circuit 22, and the packet output from the parallel-to-serial conversion circuit 22 is output to the bus BS2 via the physical layer circuit 12. In this way, the circuit device 10 can transfer the packet from the bus BS1 to the bus BS2. In this embodiment, the SYNC generation circuit 71 generates an m-bit SYNC, and thus the number of bits of the SYNC of the packet output to the bus BS2 can be m bits.

Figure 6:
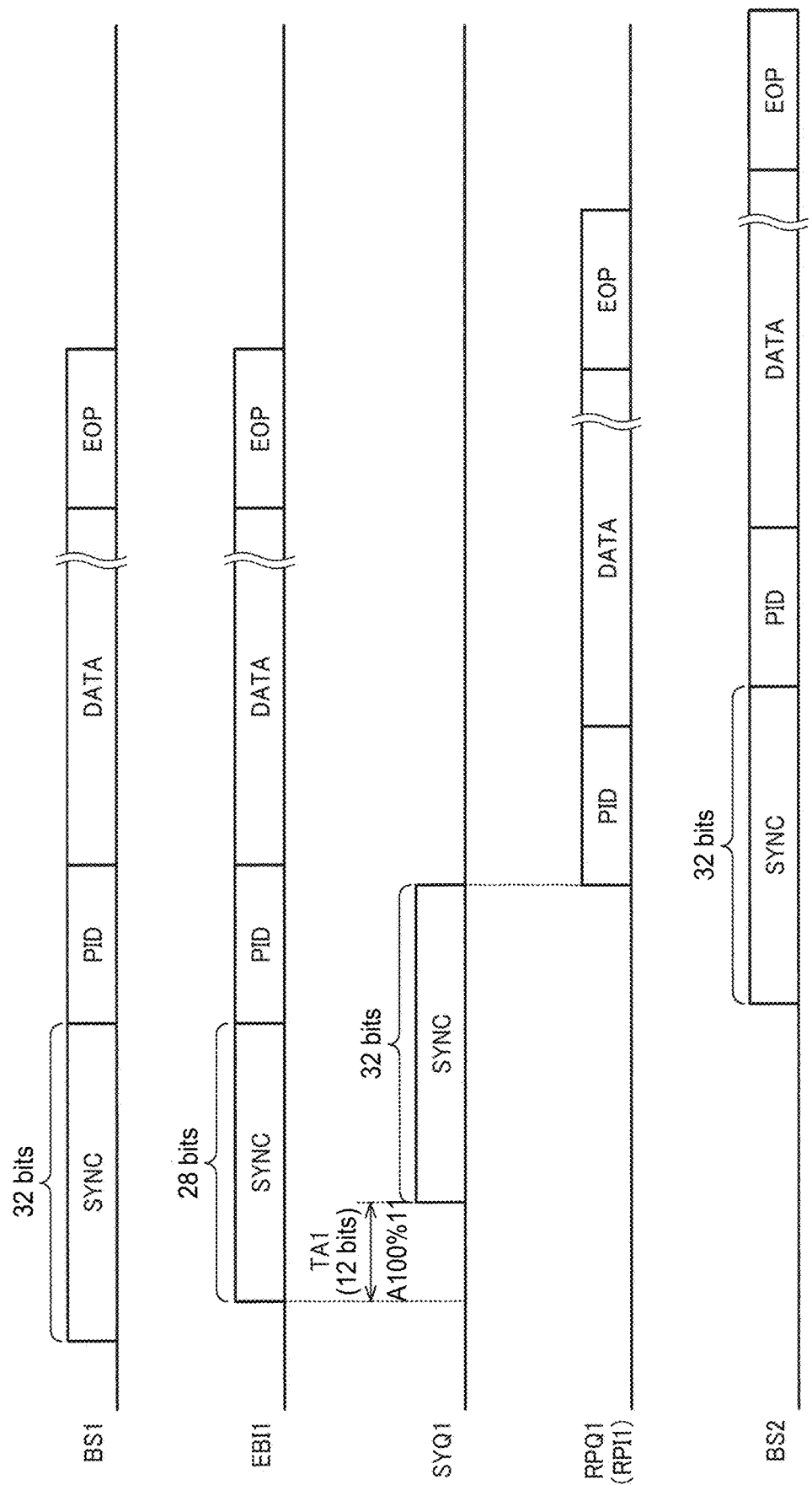
FIG. 6 is an illustrative diagram of operations of the circuit device in the first detailed configuration example.

FIG. 6 is a diagram illustrating operation of the circuit device in FIG. 5. As shown in FIG. 6, a packet including a 32-bit SYNC is input from the bus BS1 to the physical layer circuit 11, a packet (signal EBI1) including a 28-bit SYNC is output from the physical layer circuit 11, and the packet is buffered in the elasticity buffer 21.

After a period TA1 has elapsed from when the input of the packet to the elasticity buffer 21 was started, the SYNC generation circuit 71 starts the output of a 32-bit (m-bit) SYNC (signal SYQ1). The period TA1 is a period from when the input of packet to the elasticity buffer 21 is started until when 12-bit data is accumulated in the elasticity buffer 21. When the SYNC generation circuit 71 ends the output of SYNC, the repeater circuit 70 subsequently transfers the data (data excluding SYNC) buffered in the elasticity buffer 21 to the parallel-to-serial conversion circuit 22 (signal RPQ1). The parallel-to-serial conversion circuit 22 performs parallel-to-serial conversion on the SYNC from the SYNC generation circuit 71 and the data from the repeater circuit 70, and outputs the resulting SYNC and data to the physical layer circuit 12, and the packet of the corresponding serial data is output from the transmission circuit of the physical layer circuit 12 to the bus BS2.

More specifically, the repeater circuit 70 transfers the data buffered in the elasticity buffer 21 (e.g. PID, DATA, and EOP), excluding SYNC, to the parallel-to-serial conversion circuit 22. In the USB standard, the end of SYNC is "KJKK", and for example, the control circuit 73 performs detection of this end of SYNC, and performs control so as to transfer the data that comes after the pattern of "KJKK" to the parallel-to-serial conversion circuit 22.

In the example in FIG. 6, in a period from when the data after SYNC (PID) starts to be accumulated in the elasticity buffer 21 until when the SYNC generation circuit 71 ends the output of SYNC, the number of bits is 16 bits. In the USB standard, the minimum number of bits of SYNC is defined as 12 bits, and in view of this, the number of bits is 32 bits in the period from when the data (PID) after SYNC starts to be accumulated in the elasticity buffer 21 until when the SYNC generation circuit 71 ends the output of SYNC. The elasticity buffer 21 is constituted capable of buffering at least this 32-bit data. Note that the number of bits in the elasticity buffer 21 is not limited to 32 bits.

In the above-described embodiment, when the reception of a packet is started, and data with a given number of bits is accumulated in the elasticity buffer 21, the SYNC generation circuit 71 starts the output of an m-bit SYNC, and the m-bit SYNC is output from the parallel-to-serial conversion circuit 22.

Here, the given number of bits is, for example, 12 bits that is defined in the USB standard, but the number of bits is not limited thereto. In other words, it is sufficient that the number of bits is ensured with which an overrun and an underrun of the bits can be prevented in asynchronous communication.

In this way, the output of an m-bit SYNC is started in a state where data of the given number of bits is accumulated in the elasticity buffer 21, and thus the packet having the m-bit SYNC can be output to the bus BS2, and also an overrun and an underrun of the bits in asynchronous communication can be prevented.

Also, in this embodiment, when the SYNC generation circuit 71 ends the output of the m-bit SYNC, the repeater circuit 70 outputs (transfers) the data (e.g. PID, DATA, and EOP) that follows the SYNC of the packet buffered in the elasticity buffer 21.

In this way, it is possible to transfer (repeat) the data that follows the SYNC and is the substantial data content of the packet, without a change, and also to add an m-bit SYNC to the corresponding data.

Also, in this embodiment, the processing circuit 20 transmits a packet received from the second bus BS2 via the second physical layer circuit 12 to the first bus BS1 via the first physical layer circuit 11. The processing circuit 20 includes the SYNC generation circuit 81 that generates a k-bit SYNC (k is an integer greater than or equal to 1), and upon receiving a packet from the second bus BS2, the processing circuit 20 outputs the k-bit SYNC generated by the second SYNC generation circuit to the first physical layer circuit 11.

Specifically, the elasticity buffer 23, the repeater circuit 80, and the parallel-to-serial conversion circuit 24 performs operations similar to those of the elasticity buffer 21, the repeater circuit 70, and the parallel-to-serial conversion circuit 22. The SYNC generation circuit 81 and the control circuit 83 performs operations similar to those of the SYNC generation circuit 71 and the control circuit 73. For example, if k=32, operations performed by the repeater circuit 80 and the like are similar to the operations shown in FIG. 6. In other words, the operations are those in the case where the bus BS1, the signals EBI1, RPI1, SYQ1, and RPQ1, and the bus BS2, in FIG. 6, are replaced with the bus BS2, signals EBI2, RPI2, SYQ2, and RPQ2, and the bus BS1, in FIG. 5. Note that k may be an integer that is the same as m, or an integer that is different from m.

In this way, the number of bits of SYNC of the transmission packet can be set to a given number of bits (m or k) in a bidirectional transfer, namely the transfer from the bus BS1 to the bus BS2, and from the bus BS2 to the bus BS1. For example, when a packet having a 32-bit SYNC is to be received in the main controller 200 as well, the 32-bit SYNC can be transmitted to the main controller 200 by outputting a k-bit SYNC from the circuit device 10 to the bus BS1. Alternatively, it is possible to freely select which of the bus BS1 and BS2 is connected to the USB receptacle 226.

Also, in this embodiment, even if the number of bits of SYNC of the packet received by the second physical layer circuit 12 from the second bus BS2 is less than or equal to k, the first physical layer circuit 11 outputs a k-bit SYNC to the first bus BS1.

In other words, even if a SYNC having any number of bits less than or equal to k is input to the physical layer circuit 12, the physical layer circuit 11 can output a k-bit SYNC to the first bus BS1. Note that, even if a SYNC having a number of bits that is greater than k bits is input to the physical layer circuit 12, the physical layer circuit 11 can output a k-bit SYNC to the first bus BS1.

Note that in the case of transfer from the bus BS2 to the bus BS1, a configuration is also possible in which, as usual, the repeater circuit 80 repeats a SYNC whose number of bits was reduced in the physical layer circuit 12. In this case, the repeater circuit 81 does not include the SYNC generation circuit 81, and a repeat buffer 82 buffers the packet including the SYNC from the elasticity buffer 23, and outputs the corresponding packet to the parallel-to-serial conversion circuit 24. For example, in the case where the main controller is connected to the bus BS1 and the USB receptacle is connected to the bus BS2, if a 32-bit SYNC is output from the USB receptacle, the USB standard authentication test in the USB receptacle can be passed.

Figure 7:
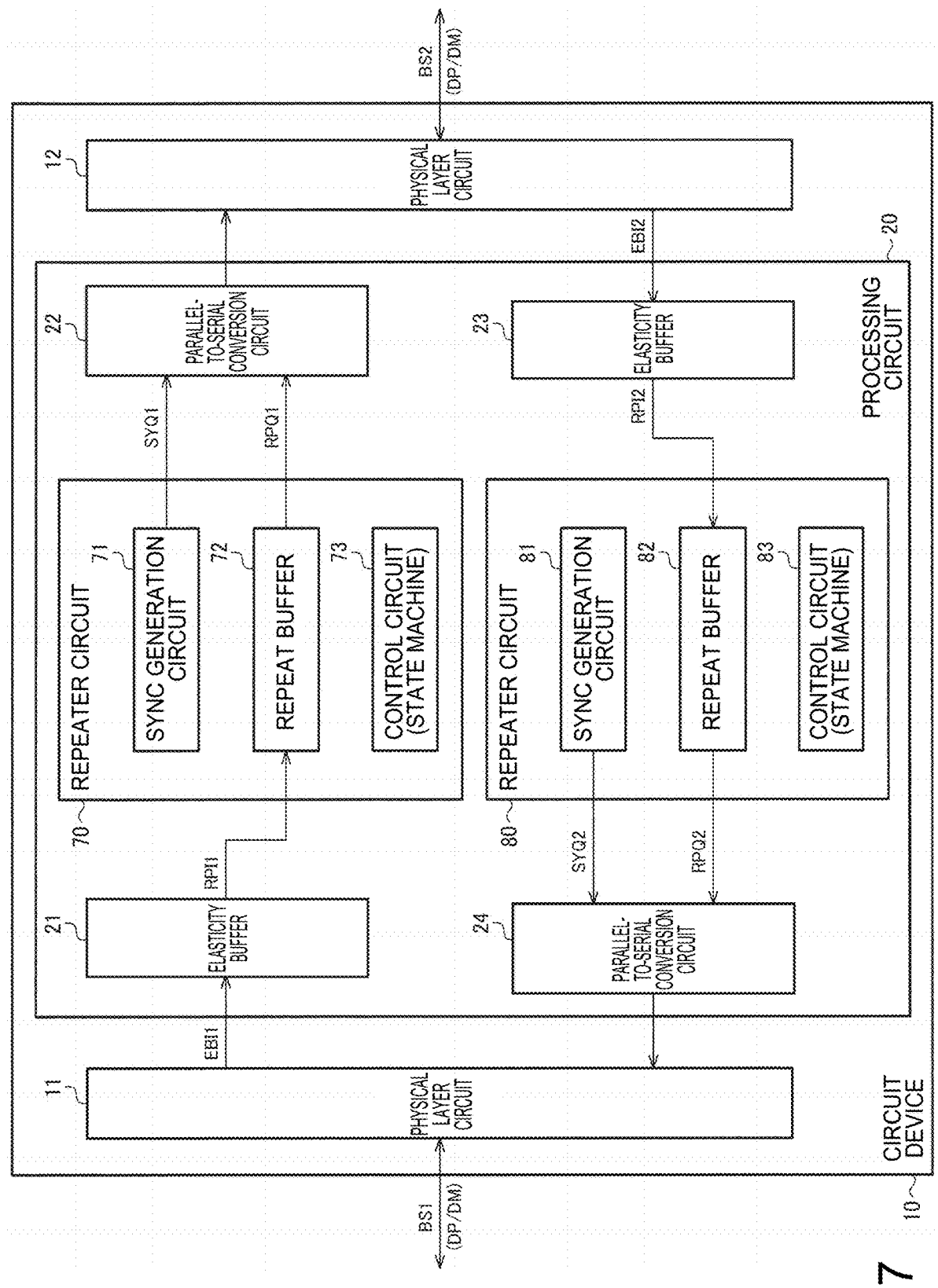
FIG. 7 shows a second detailed configuration example of the circuit device according to this embodiment.

FIG. 7 shows a second detailed configuration example of a circuit device of this embodiment. In FIG. 7, the repeater circuit 70 further includes a repeat buffer 72, and the repeater circuit 80 further includes a repeat buffer 82. Note that constituent elements that are same as constituent elements described with reference to FIGS. 5 and 6 are given the same reference numerals and further description will be omitted as appropriate.

The repeat buffer 72 is a buffer that buffers parallel data from the elasticity buffer 21 and also a buffer that can temporarily accumulate data of a predetermined number of bits. The predetermined number of bits is 20 bits, for example. In the USB standard, the maximum number of bits of SYNC is defined as 32 bits, and the minimum number is defined as 12 bits, and thus the difference, namely 20 bits, can be buffered in the repeat buffer 72.

Figure 8:
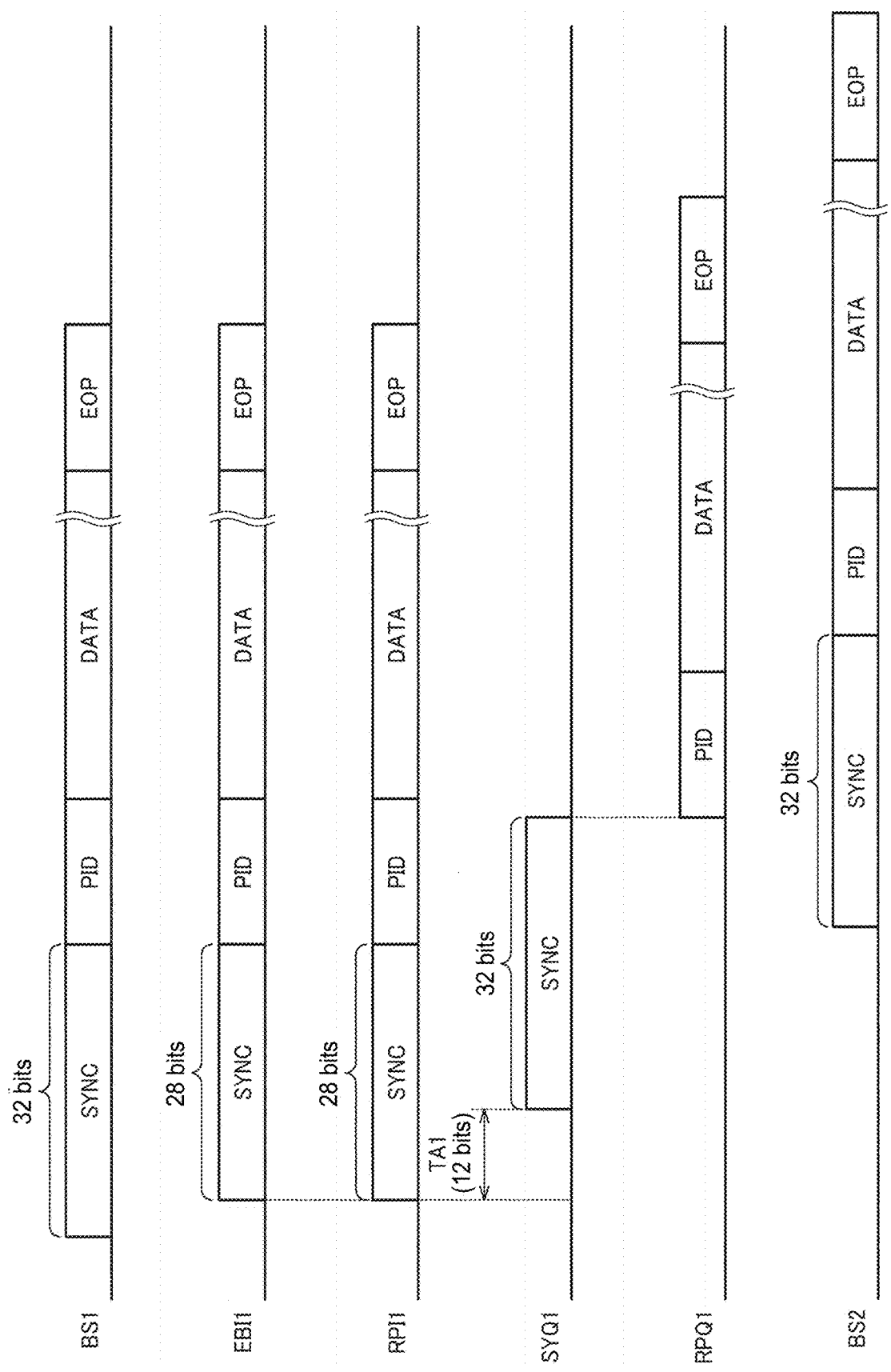
FIG. 8 is an illustrative diagram of operations of the circuit device in the second detailed configuration example.

FIG. 8 is a diagram illustrating operations of the circuit device in FIG. 7. As shown in FIG. 8, a packet including a 32-bit SYNC is input from the bus BS1 to the physical layer circuit 11, a packet (signal EBI1) including a 28-bit SYNC is output from the physical layer circuit 11, and that packet is buffered in the elasticity buffer 21.

The elasticity buffer 21 outputs the buffered packet to the repeat buffer 72 (signal RPI1). The elasticity buffer 21 buffers the data (e.g. PID, DATA, and EOP) of the input packet excluding SYNC. In the USB standard, the end of SYNC is "KJKK", and for example, the control circuit 73 performs detection of this end of SYNC, and upon detecting the pattern "KJKK", controls the repeat buffer 72 such that the bits after the corresponding pattern are buffered.

Also, after a period TA1 has elapsed from when the input of the packet to the elasticity buffer 21 was started, the SYNC generation circuit 71 starts the output of a 32-bit (m-bit) SYNC (signal SYQ1). The period TA1 is a period from when the input of the packet to the elasticity buffer 21 is started until when 12-bit data is accumulated in the elasticity buffer 21. When the SYNC generation circuit 71 ends the output of SYNC, the repeater buffer 72 subsequently outputs the buffered data (data excluding SYNC) (signal RPQ1). The parallel-to-serial conversion circuit 22 performs parallel-to-serial conversion on the SYNC from the SYNC generation circuit 71 and the data from the repeat buffer 72, and outputs the resulting SYNC and data to the physical layer circuit 12, and the packet of the corresponding serial data is output from the transmission circuit of the physical layer circuit 12 to the bus BS2.

In the above-described embodiment, if the end of SYNC of the packet buffered in the elasticity buffer 21 is detected while the m-bit SYNC is output from the SYNC generation circuit 71, the repeat buffer 72 accumulates the data (e.g. PID, DATA, or EOP) that follows SYNC of the packet among the data from the elasticity buffer 21.

In this way, the data after SYNC that is the substantial data content of the packet can be transferred (repeated) without a change, and also the m-bit SYNC can be added to the data.

Note that the repeat buffer 82 operates similarly to the repeat buffer 72. For example, if k=32, operations performed by the repeater circuit 82 and the like are similar to the operations shown in FIG. 8. In other words, the operations are those in the case where the bus BS1, the signals EBI1, RPI1, SYQ1, RPQ1, and the bus BS2, in FIG. 8, are replaced with the bus BS2, the signals EBI2, RPI2, SYQ2, RPQ2, and the bus BS1 in FIG. 7.

4. Modification

Figure 9:
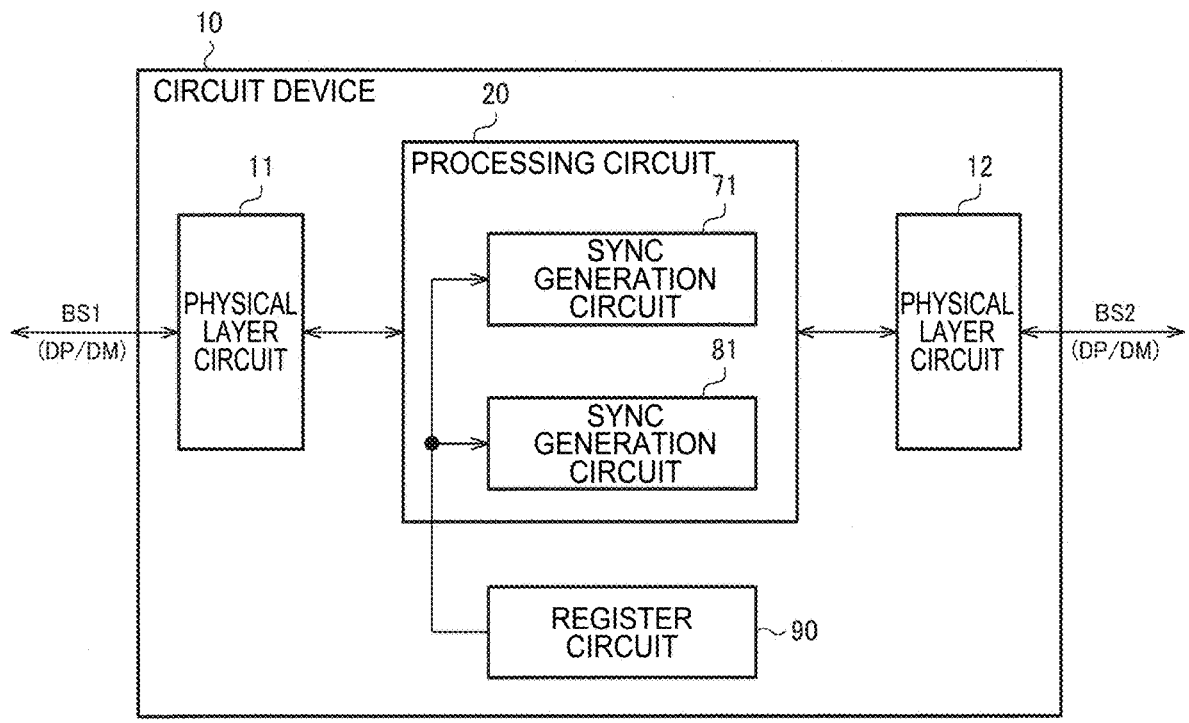
FIG. 9 shows a modification example of the circuit device according to this embodiment.

FIG. 9 shows a modification example of the circuit device according to this embodiment. In FIG. 9, the circuit device 10 further includes a register circuit 90. Note that a portion of the configuration of the processing circuit 20 (e.g. elasticity buffer) is omitted in FIG. 9.

The register circuit 90 sets the number of bits m of an m-bit SYNC generated by the SYNC generation circuit 71 to any number. Based on the number of bits m that is set in the register circuit 90, the SYNC generation circuit 71 generates an m-bit SYNC, and outputs the m-bit SYNC to the parallel-to-serial conversion circuit 22. Also, the register circuit 90 may further set the number of bits k of a k-bit SYNC generated by the SYNC generation circuit 81 to any number. Based on the number of bits k that is set in the register circuit 90, the SYNC generation circuit 81 may generate a k-bit SYNC, and may output the k-bit SYNC to the parallel-to-serial conversion circuit 24.

For example, setting information regarding the number of bits m and k is set in the register circuit 90 from an external processing device (e.g. main controller) via a not-shown interface (e.g. SPI or I2C). Alternatively, the register circuit 90 may be a fuse circuit or a non-volatile memory in which the setting information about the number of bits m and k is set at the time of manufacturing the circuit device 10, for example.

In this way, in the case where the circuit device 10 transfers the packet, the packet of the SYNC having a desired number of bits, m and k, can be output. Accordingly, it is possible to arrange the circuit device 10 at various positions in the USB transfer route of the electronic device. For example, in a configuration in which the USB receptacle is connected to the second bus BS2 (physical layer circuit 12), it is possible to pass the USB standard authentication test in the USB receptacle by setting m=32. Alternatively, in a configuration in which a device such as an USB hub is inserted between the circuit device 10 and the USB receptacle, in the case where SYNC is reduced by Δm bits in the device such as the USB hub, the setting is performed such that m=32+Δm. By doing this, at the USB receptacle, the number of bits of SYNC is m−Δm=32, and thus the USB standard authentication test can be passed in the USB receptacle. In this way, by providing the register circuit 90, it is possible to set the number of bits m in accordance with the position where the circuit device 10 is arranged.

5. Signal Characteristics of Transmission Signals

In the following, a third detailed configuration example of the circuit device according to this embodiment will be described. In the third detailed configuration example, an m-bit SYNC is output, and also a degradation in signal characteristics of transmission signals in USB is suppressed.

Figure 10:
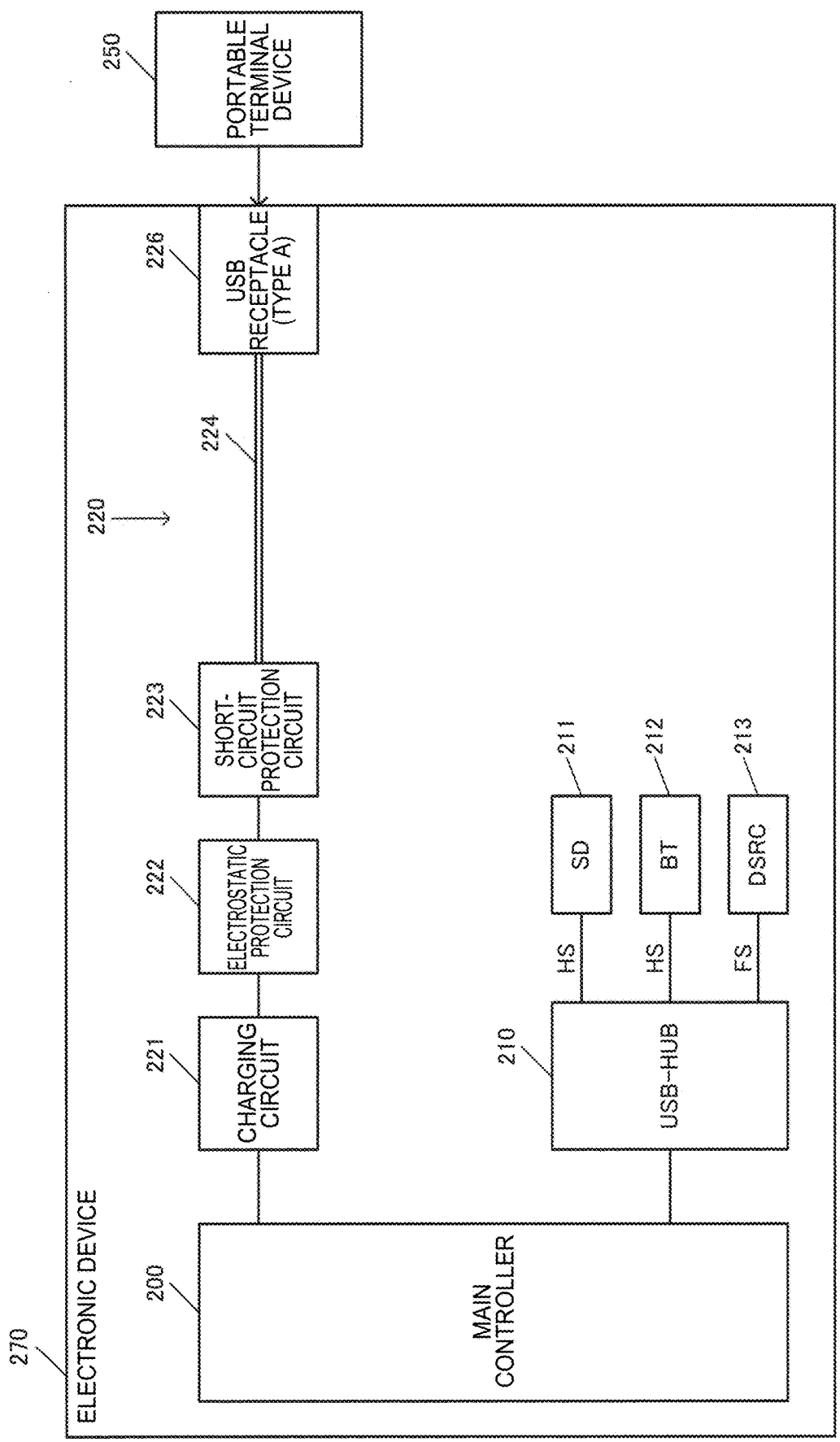
FIG. 10 is an illustrative diagram of degradation in signal characteristics of a transmission signal in USB technology.

First, degradation in signal characteristics of transmission signals in USB will be described below with reference to FIG. 10. FIG. 10 shows an example of a vehicle-mounted electronic device system in which a USB-HUB 210 is connected to a main controller 200 (host controller). In one example, an upstream port of the USB-HUB 210 is connected to the main controller 200, and a downstream port is connected to a device such as an SD 211 (SD card), a BT 212 (Bluetooth (registered trademark)), or a DSRC 213 (Dedicated Short Range Communications).

Also, a portable terminal device 250 such as a smartphone is connected to a USB receptacle 226 of a cable harness 220 having a cable 224. A charging circuit 221, an electrostatic protection circuit 222, a short-circuit protection circuit 223, and the like are provided between the main controller 200 and the USB receptacle 226.

In FIG. 10, the cable 224 is routed so as to avoid the interior or the like of a vehicle, and therefore the cable tends to be long with a length of 1 to 3 m for example, and parasitic capacitance and the like is generated. Furthermore, parasitic capacitance and the like is also generated due to circuits such as the charging circuit 221, the electrostatic protection circuit 222, and the short-circuit protection circuit 223. This parasitic capacitance and the like causes degradation in the signal characteristics of transmission signals in an USB transmission circuit (HS) of the main controller 200.

Figure 11:
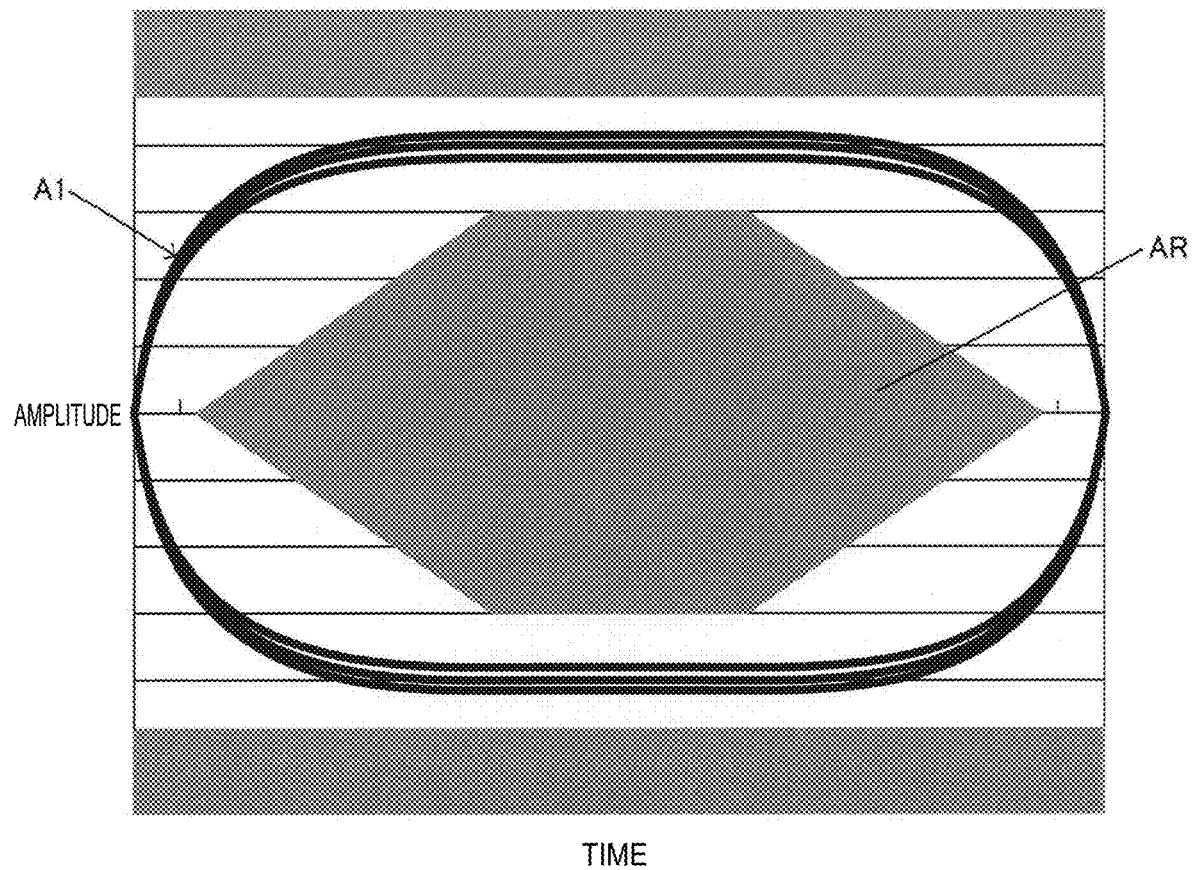
FIG. 11 is an illustrative diagram of an EYE pattern in a USB authentication test.

FIG. 11 is an illustrative diagram of an EYE pattern in a USB authentication test. AR indicates a keep-out region in the transmission signal waveform, and this keep-out region is defined in the USB standard. With a USB transmission circuit (HS), it is required that the waveforms of transmission signals (DP, DM) indicated by A1 do not overlap this keep-out region AR.

However, the signal quality of the transmission signals indicated by A1 in FIG. 11 degrades if parasitic capacitance and the like is generated due to elongation of the cable 224 that is routed in the vehicle in FIG. 10, or due to circuits such as the charging circuit 221, the electrostatic protection circuit 222, and the short-circuit protection circuit 223. For this reason, problems occur in which appropriate signal transfer cannot be realized, and the EYE pattern authentication test (e.g., a near-end authentication test) cannot be passed.

6. Third Detailed Configuration Example

Figure 12:
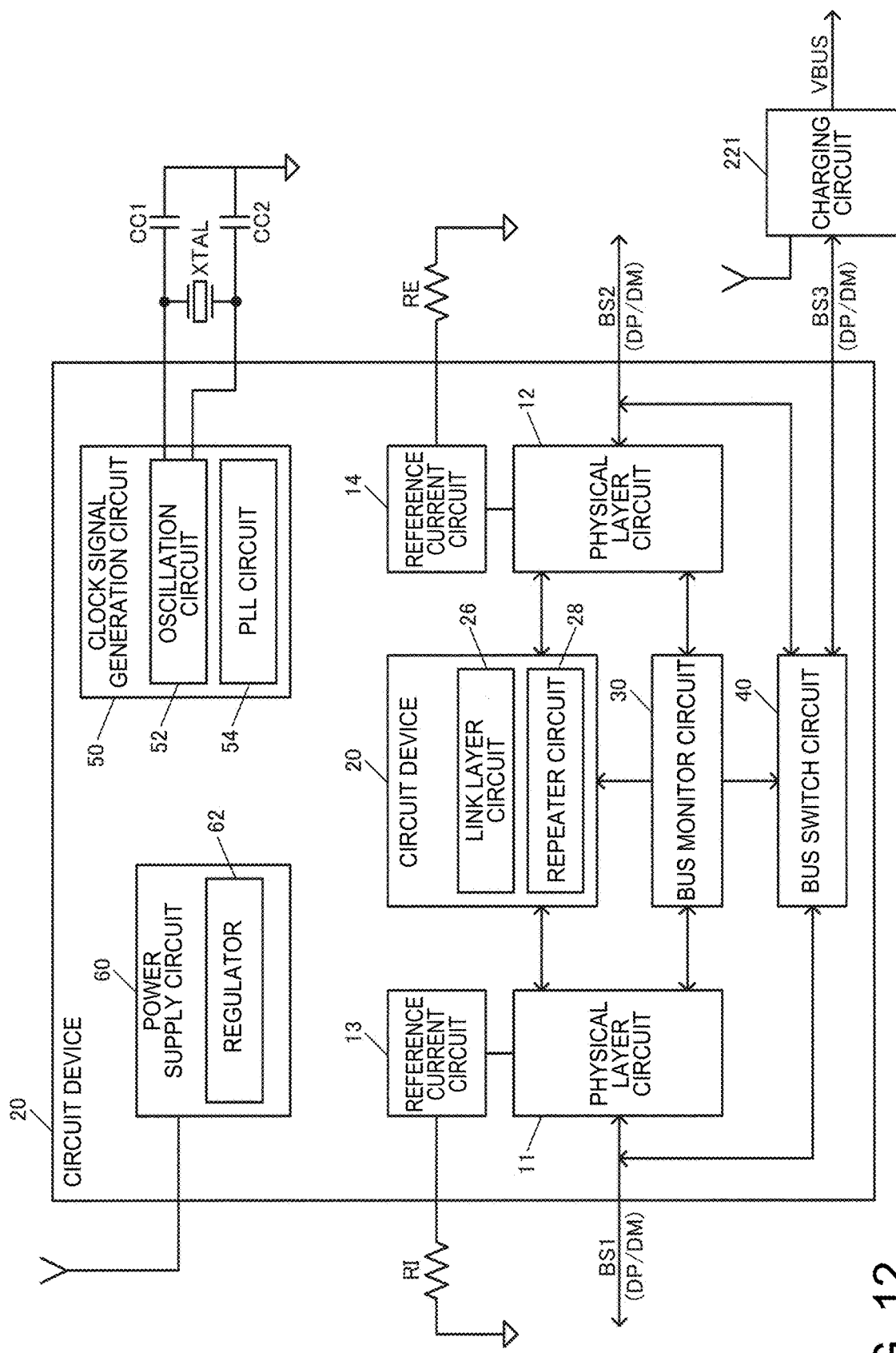
FIG. 12 shows a third detailed configuration example of the circuit device according to this embodiment.

FIG. 12 shows a third detailed configuration example of a circuit device of this embodiment. The circuit device 10 includes the physical layer circuits 11 and 12, the processing circuit 20, a bus monitor circuit 30, and a bus switch circuit 40. In addition, the circuit device 10 may include reference current circuits 13 and 14, a power supply circuit 60, and a clock signal generation circuit 50. Note that the circuit device is not limited to the configuration in FIG. 12, and various modifications can be carried out, such as omitting a portion of the constituent elements, or adding other constituent elements.

The reference current circuits 13 and 14 are circuits for generating reference currents used in the physical layer circuits 11 and 12 respectively, and generate the reference currents with use of resistances RI and RE that are external components. The clock signal generation circuit 50 is a circuit that generates various types of clock signals used in the circuit device 10, and includes an oscillation circuit 52 and a PLL circuit 54. The oscillation circuit 52 is connected to an oscillator XTAL and capacitors CC1 and CC2, which are external components. The oscillator XTAL is realized by a quartz resonator or the like. The oscillator XTAL performs an oscillation operation, and the oscillation circuit 52 generates clock signals based on the oscillation signal. The PLL circuit 54 generates the above-described multiphase clock signals based on the generated clock signal.

The power supply circuit 60 receives voltage from an external power supply, and generates various types of power supply voltages for use in the circuit device 10. Specifically, a regulator 62 of the power supply circuit 60 regulates the voltage from the external power supply, generates a power supply voltage having a lower voltage than the voltage from the external power supply, and supplies the generated power supply voltage to various circuit blocks of the circuit device 10.

The processing circuit 20 includes a link layer circuit 26, a repeater circuit 28, and the like. The link layer circuit 26 is a circuit that performs processing that corresponds to the link layer. The link layer circuit 26 performs serial-to-parallel conversion processing for converting serial data received via USB into parallel data, parallel-to-serial conversion processing for converting parallel data into serial data for transmission, processing for NRZI encoding and decoding, and the like. The link layer circuit 26 corresponds to the elasticity buffers 21 and 23 and the parallel-to-serial conversion circuits 22 and 24 in FIG. 5. The repeater circuit 28 performs logic processing for transmitting packets received from the bus BS1 side to the bus BS2 side, and transmitting packets received from the bus BS2 side to the bus BS1 side. The repeater circuit 28 corresponds to the repeater circuits 70 and 80 in FIG. 5. For example, the bits of a received packet are sampled using a clock signal, and serial data obtained by the sampling is converted into parallel data. Also, parallel data that was subjected to various types of logic processing such as NRZI is converted into serial data and transmitted in synchronization with a clock signal in the circuit device 10. According to this configuration, packet bit resynchronization processing (re-synchronization) is realized. Also, the repeater circuit 28 generates an m-bit SYNC, and by this SYNC being transmitted as a SYNC of the packet, the number of bits of the SYNC of the packet to be transmitted to the bus BS2 is m bits. Also, the repeater circuit 28 generates a k-bit SYNC, and by this SYNC being transmitted as a SYNC of the packet, the number of bits of the SYNC of the packet to be transmitted to the bus BS1 is k bits.

The bus monitor circuit 30 performs a monitor operation with respect to the buses BS1 and BS2. For example, the bus monitor circuit 30 performs a monitor operation for monitoring the two state of the bus BS1 and the bus BS2 (at least one of the two buses) based on a signal from the physical layer circuit 11 and the physical layer circuit 12 (at least one of the two physical layer circuits). Then, the bus switch circuit 40 switches on and off of the connection (electrical connection) between the bus BS1 and the bus BS2 based on the monitor result in the bus monitor circuit 30. In other words, the bus BS1 and the bus BS2 can be electrically connected, or electrically disconnected. Switching on and off the connection between (i.e., electrically connecting and disconnecting) the bus BS1 and the bus BS2 refers to switching on and off switch elements (first and second switch elements) provided between the DP and DM signal lines of the bus BS1 and the DP and DM signal lines of the bus BS2.

Figure 13:
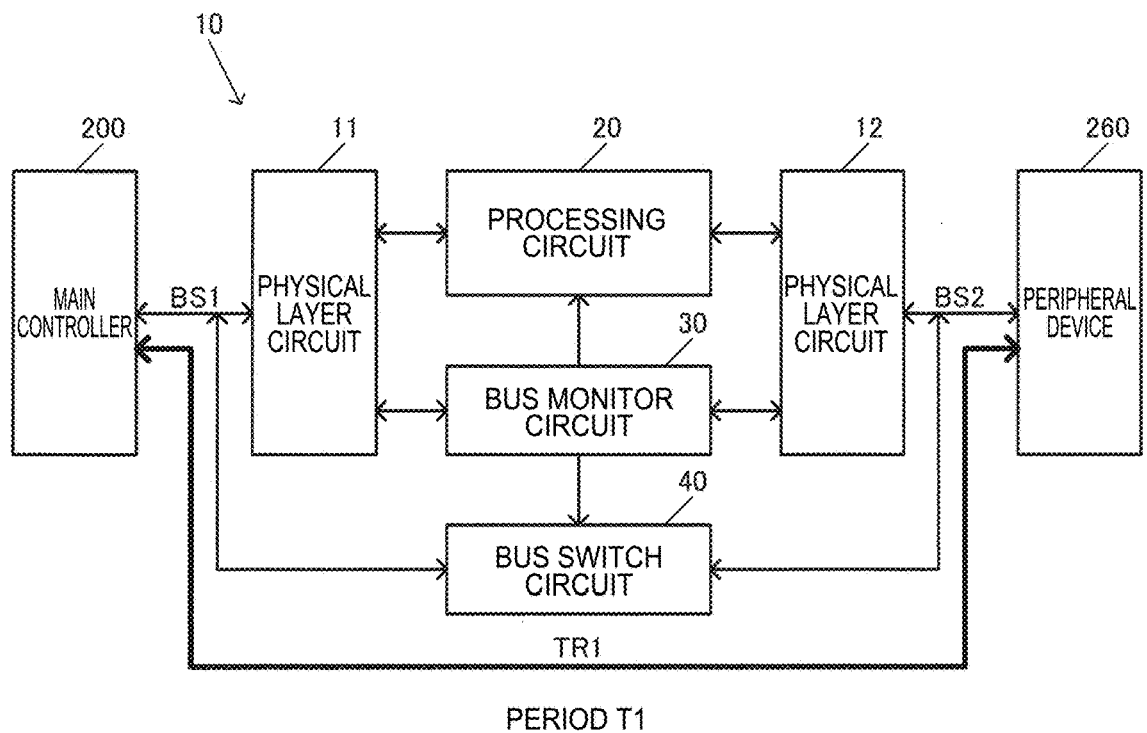
FIG. 13 is an illustrative diagram of operations of the circuit device in the third detailed configuration example.

Specifically, as shown in FIG. 13, the bus switch circuit 40 switches on the connection between the bus BS1 and the bus BS2 in a period T1 (first period). More specifically, the bus switch circuit 40 has a switch element provided between the bus BS1 and the bus BS2, and switches on that switch element in the period T1. Accordingly, the main controller 200 (or more broadly, a first device) that is connected to the bus BS1 and the peripheral device 260 (or more broadly, a second device) that is connected to the bus BS2 can directly transfer USB signals via the USB bus.

Figure 14:
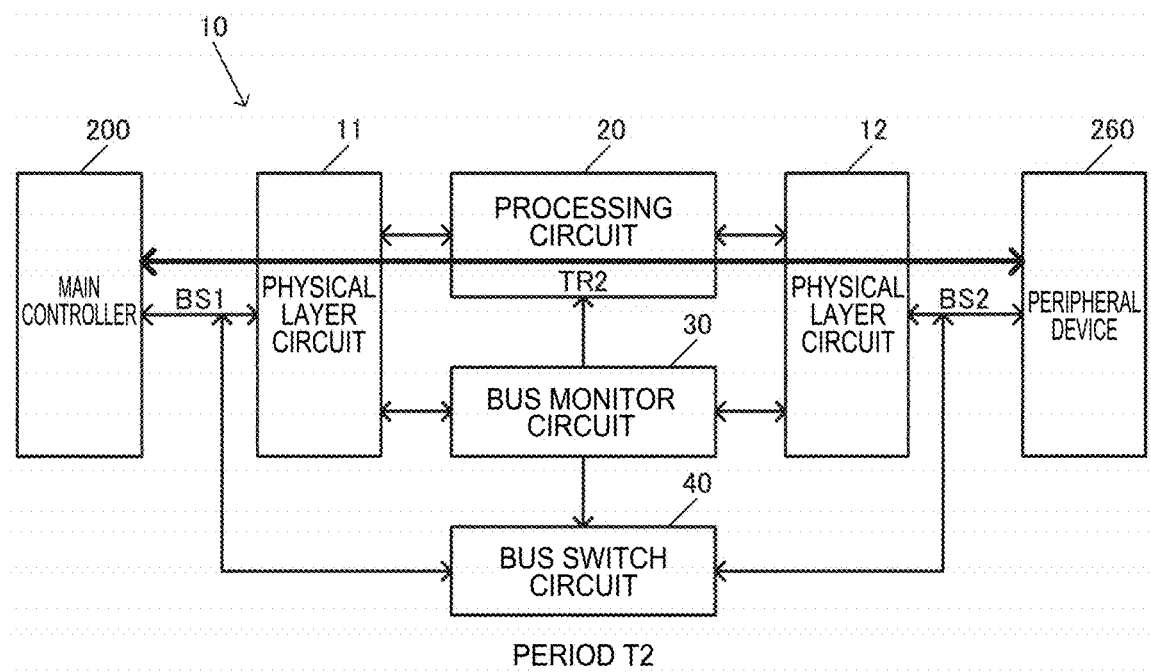
FIG. 14 is an illustrative diagram of operations of the circuit device in the third detailed configuration example.

Specifically, as shown in FIG. 14, the bus switch circuit 40 switches off the connection between the bus BS1 and the bus BS2 in a period T2 (second period). More specifically, the bus switch circuit 40 has a switch element provided between the bus BS1 and the bus BS2, and switches off that switch element in the period T2. In this period T2 (at least a portion of the period T2), the processing circuit 20 performs transfer processing that is described above. In the period T2 (at least a portion of the period T2), the processing circuit 20 performs transfer processing in which packets received from the bus BS1 via the physical layer circuit 11 are transmitted (transferred) to the bus BS2 via the physical layer circuit 12, and packets received from the bus BS2 via the physical layer circuit 12 are transmitted (transferred) to the bus BS1 via the physical layer circuit 11. Accordingly, packet bit resynchronization processing is performed, and it is possible to realize high-quality signal transfer that improves degraded signal characteristics of USB transmission signals.

Specifically, the bus monitor circuit 30 performs switch control of the bus switch circuit 40. In other words, the bus monitor circuit 30 switches on the connection between the bus BS1 and the bus BS2 using the bus switch circuit 40 in the period T1. For example, in the period T1, the bus monitor circuit 30 sets the switching control signal of the switch element in the bus switch circuit 40 to active, and switches on the switch element in the period T1. Also, the bus monitor circuit 30 switches off the connection between the bus BS1 and the bus BS2 using the bus switch circuit 40 in the period T2. For example, the bus monitor circuit 30 sets the switching control signal of the switch element in the bus switch circuit 40 to inactive, and switches off the switch element in the period T2. Also, the bus monitor circuit 30 sets a transfer processing instruction signal (permission signal) for the processing circuit 20 to active.

In this embodiment, the timing for switching on/off of the connection between the bus BS1 and the bus BS2 (timing for switching between the periods T1 and T2) is set to a timing within a predetermined range. In other words, when the host side (main controller) starts a reset, the device transmits a device chirp K. At least after a start timing of this device chirp K, the connection between the bus BS1 and the bus BS2 is switched from on to off (switched from the period T1 to the period T2). Alternatively, when a predetermined period has elapsed after the device chirp K, the device stops the device chirp K and the host executes a host chirp K/J. At least after the end timing of the host chirp K/J, the connection between the bus BS1 and the bus BS2 is switched from on to off. Upon detecting the host chirp K/J, the device switches on the HS termination and shifts to the HS mode. When the host ends the reset, the device shifts to an HS idle, and the host starts SOF transmission. At least after the start timing of the device chirp K, for example, before the timing for starting SOF transmission, the connection between the bus BS1 and the bus BS2 is switched from on to off, and transfer processing in the transfer route TR2 shown in FIG. 14 is switched from off to on.

Also, in this embodiment, in the case where the host starts a reset in the HS mode, the USB switch is switched from off to on, and transfer processing of the processing circuit 20 is switched from on to off. Specifically, in the case where a reset is performed, the bus switch circuit 40 switches the connection between the bus BS1 and the bus BS2 from off to on, and the processing circuit 20 stops the transfer processing. For example, in the case where the host starts a reset and shifts to an FS mode and 3 ms or more has elapsed since packets disappeared on the bus, the USB switch is switched from off to on. Also, in this embodiment, in the case where the host starts a suspend as well, the USB switch is switched from off to on, and transfer processing of the processing circuit 20 is switched from on to off. Specifically, in the case where a suspend is performed, the bus switch circuit 40 switches the connection between the bus BS1 and the bus BS2 from off to on, and the processing circuit 20 stops the transfer processing. For example, in the case where 3 ms or more has elapsed since the host starts a suspend and shifts to the FS mode and the packet disappeared on the bus, the USB switch is switched from off to on.

The charging circuit 221 is a circuit that performs operation compliant with the USB BC 1.2 (Battery Charging Specification Rev 1.2) specification, for example. In BC 1.2, the power supply limit of VBUS, which is 500 mA or less for example, is extended to 2A or less for example. In FIG. 12, the charging circuit 221 has a regulator circuit or the like, and receives external power and supplies power to VBUS. Also, although it has only been possible to supply power from the master side to the slave side, in BC 1.2, power can also be supplied from the slave side to the master side. For example, even in the case where the peripheral device 260 plays the role of the master, and the main controller 200 plays the role of the slave, VBUS power can be supplied from the main controller 200 that is the slave to the peripheral device 260 that is the master.

In order to realize BC 1.2, the charging circuit 221 needs to execute a BC 1.2 protocol by transferring signals to the peripheral device 260 using DP and DM in a charging arbitration period. For this reason, in the charging arbitration period (BC 1.2 protocol execution period), the bus switch circuit 40 switches on (switches from off to on) the connection between the bus BS2 (second bus) and a bus BS3 (third bus) to which the charging circuit 221 is connected. In other words, the bus BS3 and the bus BS2 become electrically connected. For example, the switch element provided between the bus BS3 and the bus BS2 is switched on such that signal transmission using DP and DM can be executed between the charging circuit 221 and the peripheral device. According to this configuration, in the charging arbitration period, charging arbitration processing can be performed by executing the BC 1.2 protocol. For example, it is possible to set an appropriate charging current, and therefore the charging speed can be raised.

7. Physical Layer Circuit

Figure 15:
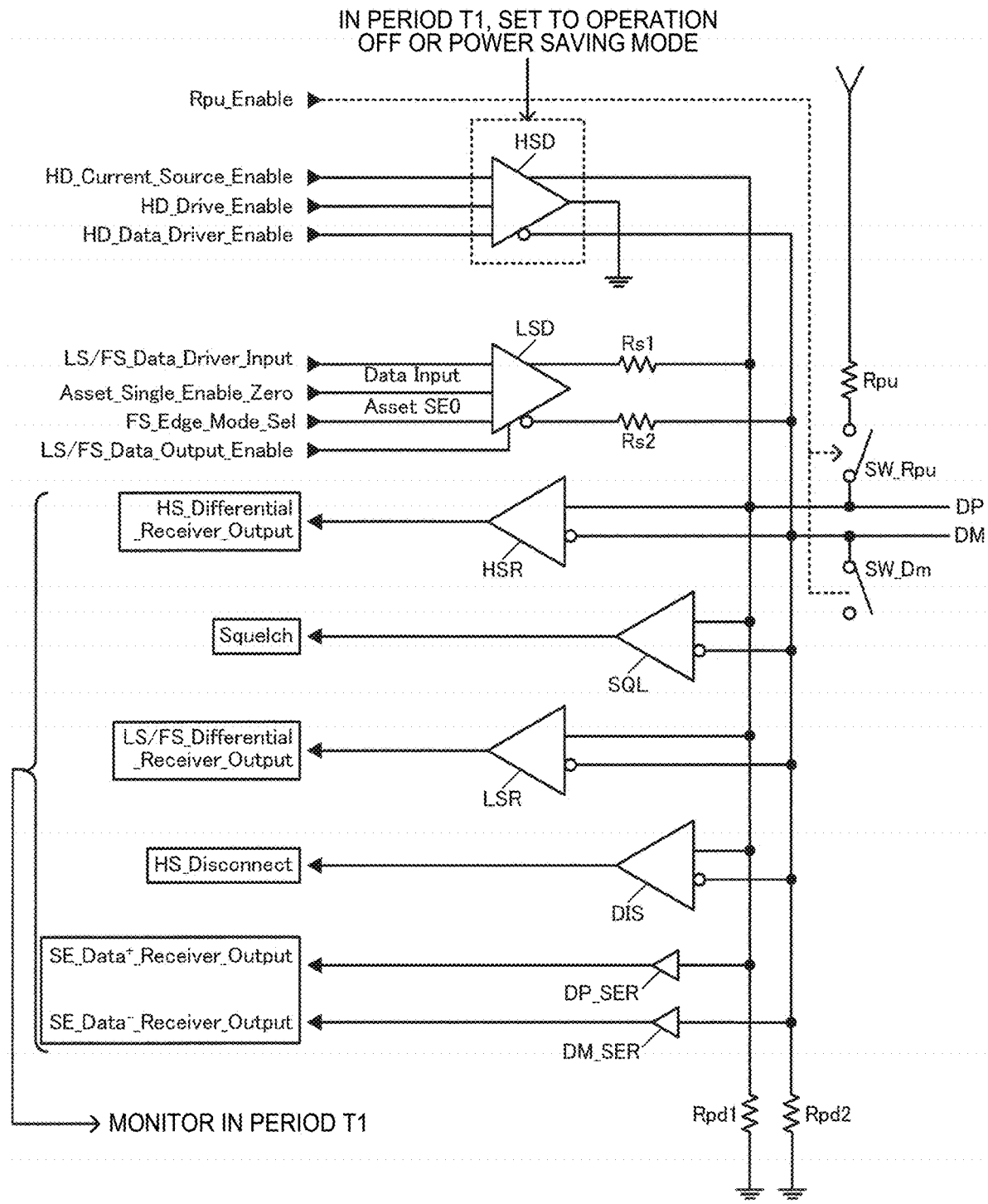
FIG. 15 shows a configuration example of a physical layer circuit.

FIG. 15 shows a configuration example of one physical layer circuit (11, 12). This physical layer circuit, includes a pull-up resistance Rpu, switch elements SW_Rpu and SW_Dm, and pull-down resistances Rpd1 and Rpd2. The switch element SW_Rpu is switched on and off based on a control signal Rpu_Enable. A pull-down operation is thus realized. Also, the physical layer circuit includes an HS mode transmission circuit HSD (current driver), an LS/FS mode transmission circuit LSD (driver), and resistances Rs1 and Rs2. The physical layer circuit also includes an HS mode differential reception circuit HSR (data receiver), a squelch detection circuit SQL (transmission envelope detector), an LS/FS mode differential reception circuit LSR (data receiver), a disconnection detection circuit DIS (disconnection envelope detector), and single-end reception circuits DP_SER and DM_SER (receiver).

In this embodiment, the input of a packet to the physical layer circuit is detected based on the signal from the analog circuit that constitutes the physical layer circuit. Specifically, in the case where the squelch detection circuit SQL detects a packet, and the processing circuit 20 detects that the output of the detection circuit SQL becomes active, the packets from the reception circuit DP_SER and DM_SER are buffered in the elasticity buffer. There is a delay time between when the input of SYNC to the physical layer circuit is started until when SYNC is detected by the squelch detection circuit SQL, and thus a few bits at the head of SYNC are not buffered in the elasticity buffer. In this embodiment, the SYNC generation circuit generates an m-bit SYNC, and thus, regardless of a decrease of the number of bits of SYNC in the physical layer circuit, a packet having an m-bit SYNC can be output from the physical layer circuit on the transmission side.

Also, in this embodiment, the bus monitor operation is performed by the bus monitor circuit 30 based on a signal from an analog circuit that constitutes the physical layer circuit. Specifically, as shown in FIG. 15, the bus monitor circuit 30 performs the bus monitor operation based on a signal from the HS mode differential reception circuit HSR, the squelch detection circuit SQL, the LS/FS mode differential reception circuit LSR, the disconnection detection circuit DIS, or the single-end reception circuits DP_SER and DM_SER. Specifically, based on signals from these analog circuits, the bus monitor circuit 30 can monitor bus states such as device chirp K, host chirp K/J, idle, reset, suspend, resume, SEO, J, K, bus reset, or HS disconnect. Based on the monitor result, the bus monitor circuit 30 performs control for switching on or off switch elements (USB switch, BC switch) of the bus switch circuit 40, and performs control for switching on or off transfer processing of the processing circuit 20. According to this configuration, it is possible to realize appropriate switch control performed by the bus switch circuit 40 and transfer control performed by the processing circuit 20 that are based on an appropriate determination of the bus state.

8. Electronic Device, Cable Harness

Figure 16:
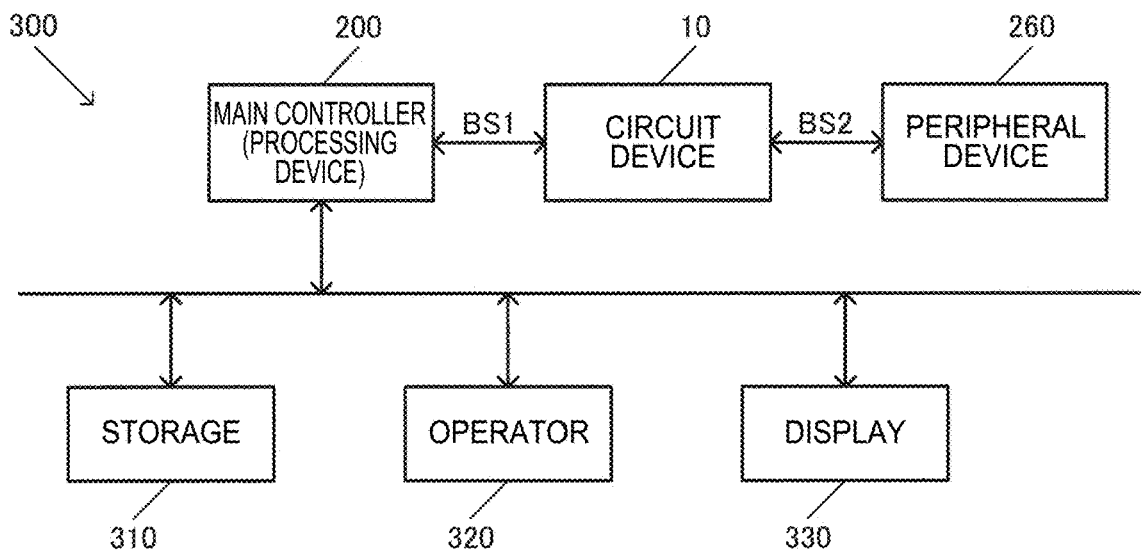
FIG. 16 shows a configuration example of an electronic device.

FIG. 16 shows a configuration example of an electronic device 300 that includes the circuit device 10 of this embodiment. This electronic device 300 includes the circuit device 10 of this embodiment and the main controller 200 (more broadly, a processing device). The main controller 200 is connected to the bus BS1. For example, the main controller 200 and the circuit device 10 are connected via the bus BS1. Also, the peripheral device 260, for example, is connected to the bus BS2 of the circuit device 10.

The main controller 200 (processing device) is realized by a processor such as a CPU or an MPU. Alternatively, the main controller 200 may be realized by any of various ASIC circuit devices. Moreover, the main controller 200 may be realized by a circuit board on which multiple circuit devices (ICs) and circuit components are mounted. The portable terminal device 250 shown in FIG. 10 or the like can be envisioned as the peripheral device 260, but there is no limitation to this. The peripheral device 260 may be a wearable device or the like.

The electronic device 300 can further include a storage 310, an operator 320, and a display 330. The storage 310 is for storing data, and the functionality thereof can be realized by an HDD (Hard Disk Drive), a semiconductor memory such as a RAM or a ROM, or the like. The operator 320 enables a user to perform input operations, and can be realized by operation devices such as operation buttons or a touch panel display. The displayer 330 is for displaying various types of information, and can be realized by a display such as a liquid crystal display or an organic EL display. Note that in the case of using a touch panel display as the operator 320, this touch panel display can realize the functionality of both the operator 320 and the display 330.

Various types of devices can be envisioned as the electronic device 300 realized by this embodiment, examples of which include a vehicle-mounted device, a printing device, a projecting device, a robot, a head-mounted display device, a biological information measurement device, a measurement device for measuring a physical quantity such as distance, time, flow speed, or flow rate, a network-related device such as a base station or a router, a content provision device that distributes content, and a video device such as a digital camera or a video camera.

Figure 17:
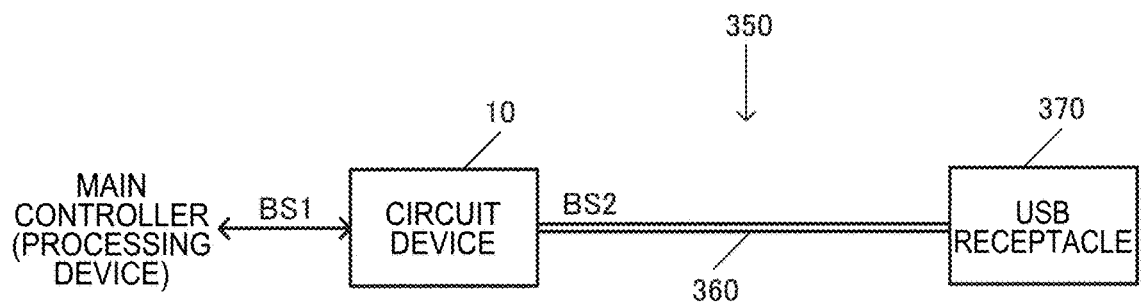
FIG. 17 shows a configuration example of a cable harness.

FIG. 17 shows a configuration example of a cable harness 350 that includes the circuit device 10 of this embodiment. The cable harness 350 includes the circuit device 10 of this embodiment and a cable 360. The cable 360 is a USB cable. The cable harness 350 may include a USB receptacle 370. Alternatively, the cable harness 350 may include the electrostatic protection circuit 222 and the short-circuit protection circuit 223 in FIG. 10, for example. The cable 360 is connected to the bus BS2 of the circuit device 10, for example. The main controller 200 (processing device) or the like is connected to the bus BS1 side of the circuit device 10. This cable harness 350 is used in an application such as the routing of a wire in a vehicle, for example. Note that the cable harness 350 may be a harness for an application other than a vehicle.

Note that although an embodiment has been explained in detail above, a person skilled in the art will readily appreciate that it is possible to implement numerous variations and modifications that do not depart substantially from the novel aspects and effect of the disclosure. Accordingly, all such variations and modifications are also to be included within the scope of the disclosure. For example, terms that are used within the description or drawings at least once together with broader terms or alternative synonymous terms can be replaced by those other terms at other locations as well within the description or drawings. Also, all combinations of the embodiment and variations are also encompassed in the range of the disclosure. Moreover, the configuration and operation of the circuit device, the electronic device, and the cable harness and the like are not limited to those described in the embodiment, and various modifications are possible.

What is claimed is:

1. A circuit device comprising:
  a first physical layer circuit to which a first bus compliant with a given serial communication standard is connected, the first physical layer circuit being configured to receive a packet from the first bus, the packet including both first data and a first SYNC pattern having a first number of bits;

a second physical layer circuit to which a second bus compliant with the given serial communication standard is connected; and a processing circuit that performs transfer processing of the packet between the first physical layer circuit and the second physical layer circuit, wherein the processing circuit is configured to receive the packet from the first physical layer circuit with the packet including both the first data and a second SYNC pattern having a second number of bits less than the first number of bits, the processing circuit includes a SYNC generation circuit that generates an m-bit SYNC pattern (m being an integer greater than or equal to 1) which increases a number of bits relative to the second SYNC pattern having the second number of bits, where m is greater than the second number of bits and equal to the first number of bits, such that the SYNC generation circuit resynchronizes the packet using a clock signal internal to the processing circuit, and the processing circuit transmits the packet to the second bus via the second physical layer circuit with the packet including both the first data and the m-bit SYNC pattern having the first number of bits.

2. The circuit device according to claim 1, wherein the processing circuit further includes:

an elasticity buffer that buffers the packet;

a repeater circuit that has the SYNC generation circuit and performs transfer processing of the packet that is buffered in the elasticity buffer; and a parallel-to-serial conversion circuit that performs parallel-to-serial conversion on data output from the repeater circuit and outputs the converted data to the second physical layer circuit.

3. The circuit device according to claim 2, wherein when reception of the packet is started and data of a given number of bits is accumulated in the elasticity buffer, the SYNC generation circuit starts the output of the m-bit SYNC pattern, and the m-bit SYNC pattern is output from the parallel-to-serial conversion circuit.

4. The circuit device according to claim 2, wherein the repeater circuit further has a repeat buffer, and when an end of the SYNC pattern of the packet buffered in the elasticity buffer is detected during the output of the m-bit SYNC pattern performed by the SYNC generation circuit, the repeat buffer accumulates data that follows the SYNC pattern of the packet among data from the elasticity buffer.

5. The circuit device according to claim 2, wherein the elasticity buffer includes an edge detection circuit configured to detect whether a serial data edge exists within a multiphase clock signal of the packet and output corresponding edge detection information.

6. The circuit device according to claim 1, wherein the processing circuit transmits a packet received from the second bus to the first bus via the first physical layer circuit, the processing circuit includes a second SYNC generation circuit that generates a k-bit SYNC pattern (k being an integer greater than or equal to 1), and upon receiving the packet from the second bus, the processing circuit outputs the k-bit SYNC pattern generated by the second SYNC generation circuit to the first physical layer circuit.

7. The circuit device according to claim 6, wherein the first physical layer circuit outputs the k-bit SYNC pattern to the first bus even if the number of bits of the packet received by the second physical layer circuit from the second bus is less than or equal to k bits.

8. The circuit device according to claim 1, wherein the m-bit SYNC pattern is generated based on the given serial communication standard such that the integer m is determined based on the given serial communication standard and not based on the second SYNC pattern of the packet received by the processing circuit from the first physical layer circuit.

9. The circuit device according to claim 1, wherein the packet further includes a packet ID (PID) and an end of packet (EOP).

10. The circuit device according to claim 1, wherein the processing circuit further includes elasticity buffers, parallel-to-serial conversion circuits, and repeater circuits.

11. The circuit device according to claim 1, further comprising a register circuit connected to the processing circuit, wherein the register circuit stores setting information regarding the number of bits m, the number of bits m being set in the register circuit based on a position where the circuit device is arranged in a USB transfer route for the packet, and the SYNC generation circuit generates the m-bit SYNC pattern based on the number of bits m set in the register circuit.

12. The circuit device according to claim 1, wherein the SYNC generation circuit generates the m-bit SYNC pattern to restore bits lost from the first SYNC pattern when the processing circuit receives the packet from the first physical layer circuit.

13. The circuit device according to claim 1, wherein the serial communication standard is a USB standard.

14. An electronic device comprising:
the circuit device according to claim 1; and
a processing device that is connected to the first bus.

15. A cable harness comprising:
the circuit device according to claim 1; and
a cable.

16. A data transfer method for a circuit device, the method comprising:

receiving, by a first physical layer circuit of the circuit device, a packet from a first bus in compliance with a given serial communication standard, the packet including both first data and a first SYNC pattern having a first number of bits;

receiving, by a processing circuit of the circuit device, the packet from the first physical layer circuit with the packet including both the first data and a second SYNC pattern having a second number of bits less than the first number of bits;

generating, by the processing circuit, an m-bit SYNC pattern (m being an integer greater than or equal to 1) increase a number of bits relative to the second SYNC pattern having the second number of bits, where m is greater than the second number of bits and equal to the first number of bits, such that the packet is resynchronized using a clock signal internal to the processing circuit; and outputting, by the processing circuit, the m-bit SYNC pattern to a second bus compliant with the given serial communication standard.

17. The data transfer method according to claim 16, wherein
  the m-bit SYNC pattern is generated based on the given serial communication standard such that the integer m is determined based on the given serial communication standard and not based on the second SYNC pattern of the packet received by the processing circuit from the first physical layer circuit.

18. The data transfer method according to claim 16, further comprising,
  detecting, by an edge detection circuit of an elasticity buffer of the processing circuit, whether a serial data edge exists within a multiphase clock signal of the packet; and
  outputting corresponding edge detection information.

19. The data transfer method according to claim 16, further comprising
  storing, in a register circuit of the circuit device, setting information regarding the number of bits m, the number of bits m being set in the register circuit based on a position where the circuit device is arranged in a USB transfer route for the packet, wherein
  the m-bit SYNC pattern is generated based on the number of bits m set in the register circuit.

20. The data transfer method according to claim 16, wherein
  the m-bit SYNC pattern is generated to restore bits lost from the first SYNC pattern when the packet is received by the processing circuit from the first physical layer circuit.

* * * * *